(12) United States Patent
Fuchs et al.

(10) Patent No.: US 11,884,772 B2
(45) Date of Patent: Jan. 30, 2024

(54) PHENYLPHOSPHINE OXIDE AND OXYGEN STABLE EPOXY POLYMERS AND METHODS OF SYNTHESIS

(71) Applicant: The University of Southern Mississippi, Hattiesburg, MS (US)

(72) Inventors: Witold K. Fuchs, Hattiesburg, MS (US); Jeffrey Wiggins, Petal, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 0 days.

(21) Appl. No.: 17/409,423

(22) Filed: Aug. 23, 2021

(65) Prior Publication Data

US 2022/0056198 A1 Feb. 24, 2022

Related U.S. Application Data

(60) Provisional application No. 63/068,730, filed on Aug. 21, 2020.

(51) Int. Cl.
| | | |
|---|---|---|
| *C08G 59/30* | (2006.01) | |
| *C08G 59/50* | (2006.01) | |
| *C09D 163/00* | (2006.01) | |
| *C08J 7/04* | (2020.01) | |
| *C08J 5/04* | (2006.01) | |
| *C08J 7/12* | (2006.01) | |
| *C09D 7/20* | (2018.01) | |

(52) U.S. Cl.
CPC ......... *C08G 59/304* (2013.01); *C08G 59/504* (2013.01); *C08J 5/042* (2013.01); *C08J 7/0427* (2020.01); *C08J 7/12* (2013.01); *C09D 7/20* (2018.01); *C09D 163/00* (2013.01); *C08J 2463/00* (2013.01)

(58) Field of Classification Search
CPC ...... C08L 63/00–10; C09D 163/00–10; C09D 5/18; C09J 163/00–10; C08J 2363/00–10; C08J 2463/00–10; C08G 59/304; C08G 59/504
See application file for complete search history.

(56) References Cited

U.S. PATENT DOCUMENTS

| | | | |
|---|---|---|---|
| 4,973,631 | A | 11/1990 | McGrath et al. |
| 5,387,629 | A | 2/1995 | McGrath et al. |
| 5,683,757 | A | 11/1997 | Iskanderova et al. |
| 6,645,631 | B2 | 11/2003 | Gan et al. |

(Continued)

FOREIGN PATENT DOCUMENTS

| | | |
|---|---|---|
| CN | 102649837 A | 8/2012 |
| CN | 110205724 A | 9/2019 |
| EP | 2409979 B1 | 6/2019 |

OTHER PUBLICATIONS

Bilow et al., "Development of Phosphorylated Adhesives," NASA Contractor Report 166507 (1983).*

(Continued)

*Primary Examiner* — Kregg T Brooks
(74) *Attorney, Agent, or Firm* — Butler Snow LLP

(57) ABSTRACT

A polymer formed of at least one phenylphosphine oxide functional epoxide crosslinked with at least one phenylphosphine oxide amine such that the polymer has phosphorous concentrations of at least about 8 percent by weight, at least about 8.5 percent by weight, or any value or range of values therebetween.

11 Claims, 23 Drawing Sheets

(56) References Cited

U.S. PATENT DOCUMENTS

| | | | |
|---|---|---|---|
| 6,841,652 | B2 | 1/2005 | Connell et al. |
| 7,201,957 | B2 | 4/2007 | Timberlake et al. |
| 7,488,766 | B2 | 2/2009 | Peters et al. |
| 9,006,371 | B1 | 4/2015 | Wright et al. |
| 9,534,108 | B2 | 1/2017 | Timberlake et al. |
| 10,240,090 | B2 | 3/2019 | Bhowmik et al. |
| 2004/0121990 | A1 | 6/2004 | Hanson et al. |
| 2004/0247881 | A1 | 12/2004 | Dean et al. |
| 2008/0021193 | A1 | 1/2008 | Lin et al. |
| 2009/0039208 | A1* | 2/2009 | Raeckers ............ B29C 66/114 244/119 |
| 2009/0274916 | A1 | 11/2009 | Takahashi et al. |
| 2011/0065838 | A1 | 3/2011 | Timberlake et al. |
| 2014/0224529 | A1 | 8/2014 | Dobashin et al. |
| 2014/0228519 | A1 | 8/2014 | Nakayama et al. |
| 2020/0247986 | A1 | 8/2020 | Ito et al. |

OTHER PUBLICATIONS

Dow Liquid Epoxy Resins (1999).*

Liu et al., "Phosphorus-Containing Epoxy for Flame Retardant. III: Using Phosphorylated Diamines as Curing Agents," J. Appl. Polym. Sci. 63, 895-901 (1997).*

Fuchs et al., Atomic Oxygen-Resistant Epoxy-amines Containing Phenylphosphine Oxide as Low Earth Orbit Stable Polymers, ACS Applied Polymer Materials, vol. 3, No. 1, Dec. 7, 2020 [retrieved on Dec. 6, 2021]. Retrieved from the Internet: <URLhttps://pubs.acs.org/doi/10.1021/acsapm.0c01017>. abstract and supporting information.

Connell, John W., and Kent A. Watson. "Polyimides containing fluorine and phosphorus for potential space applications." (2000).

Cooper R.G. Harrison A.P. The exposure to and health effects of antimony. Indian J Occup Environ Med. 2009; 13(1):3-10. Retrieved from the Internet: https://www.ncbi.nlm.nih.gov/pmc/articles/PMC2822166/.

Yang, J. C. K. K. de Groh. Materials Issues in the Space Environment. MRS Bulletin 35 (Jan. 2010): 12-19.

B. Banks, S. Miller, and K. de Groh. "Low Earth Orbital Atomic Oxygen Interactions with Materials." In 2nd International Energy Conversion Engineering Conference. International Energy Conversion Engineering Conference (IECEC). American Institute of Aeronautics and Astronautics, 2004. https://doi.org/10.2514/6.2004-5638.

Jadhav, Sanjay D. "A review of non-halogenated flame retardant." The Pharma Innovation 7.5, Part F (2018): 380.

Trejo-Machin, A., Puchot, L., & Verge, P. (2019). Design and Synthesis of Bio-Based Benzoxazines. IntechOpen. doi: 10.5772/intechopen.76104. Retrieved from https://www.intechopen.com/books/paint-and-coatings-industry/design-and-synthesis-of-bio-based-benzoxazines.

Zhao, Y.; Gao, H.; Li, G. M.; Liu, F. F.; Dai, X. M.; Dong, Z. X.; Qiu, X. P. Synthesis and AO Resistant Properties of Novel Polyimide Fibers Containing Phenylphosphine Oxide Groups in Main Chain. Chinese J. Polym. Sci. English Ed. 2019, 37, 59-67.

Polybenzoxazine on the horizon? https://www.compositesworld.com/blog/post/polybenzoxazine-on-the-horizon.

Flame Retardants For Aerospace Plastics Market Worth $29.1Mn By 2022, Mar. 2016. https://www.prnewswire.com/news-releases/flame-retardants-for-aerospace-plastics-market-worth-291mn-by-2022-grand-view-research-inc-573041881.html.

Connell J.W. The Effect of Low Earth Orbit Atomic Oxygen Exposure on Phenylphosphine Oxide-Containing Polymers. High Performance Polymers. 2000; 12(1):43-52. doi:10.1088/0954-0083/12/1/304.

Jin, J.; Smith, D.W.; Topping, C.M.; Suresh, S.; Chen, S.; Foulger, S. H.; Rice, N.: Nebo, J.; Mojazza, B. H. "Synthesis and Characterization of Phenylphosphine Oxide Containing Perfluorocyclobutyl Aromatic Ether Polymers for Potential Space Applications." Macromolecules 2003, 36 (24), 9000-9004.

Shree Meenakshi, K.; Pradeep Jaya Sudhan, E.; Ananda Kumr, S.; Umapathy, M. J. "Development and characterization of novel DOPO based phosphorus tetraglycidyl epoxy nanocomposites for aerospace applications." Progress in Organic Coatings 2011, 72 (3), 402-409.

Fuchs, W. et al., Atomic Oxygen-Resistant Epoxy-amines Containing Phenylphosphine Oxide as Low Earth Orbit Stable Polymers, ACS Applied Polymer Materials, vol. 3, No. 1, Dec. 7, 2020.

Phenylphosphine oxide functional benzoxazine as low earth orbit stable composite matrix polymers. W. Fuchs, J. Wiggins, Abstracts of papers of ACS 247, Orlando, Apr. 2019. Retrieved from https://www.morressier.com/o/event/5fc642c603137aa525863c7c/article/5fc643a32d78d1fec466939f.

Minton, T. K.; Wright, M. E.; Tomczak, S. J.; Marquez, S. A.; Shen, L.; Brunsvold, A. L.; Cooper, R.; Zhang, J.; Vij, V.; Guenthner, A. J.; Petteys, B. J. Atomic Oxygen Effects on POSS Polyimides in Low Earth Orbit. ACS Appl. Mater. Interfaces 2012, 4 (2), 492-502. https://doi.org/10.1021/am201509n. Retrieved from https://www.researchgate.net/publication/51906870.

Fischer, H. R.; Tempelaars, K.; Kerpershoek, A.; Dingemans, T.; Iqbal, M.; Lonkhuyzen, H. Van; Iwanowsky, B.; Semprimoschnig, C. Development of Flexible LEO-Resistant PI Films for Space Applications Using a Self-Healing Mechanism by Surface-Directed Phase Separation of Block Copolymers. ACS Appl. Mater. Interfaces 2010, 2 (8), 2218-2225. https://doi.org/10.1021/am100223v. Retrieved from https://www.researchgate.net/publication/45535324.

Dinguirard, M., Mandeville, J.C., Van Eesbeek, M., Tighe, A.P., Durin, C., Chambers, A., Gabriel, S., Goulty, D., Roberts, G. Materials Exposure and Degradation Experiment. Am. Inst. Aeronaut. Astronaut. 2001, No. c.

Imai, F.; Imagawa, K. Nasda's Space Environment Exposure Experiment on ISS—First Retrieval of SM/MPAC&SEED. Eur. Sp. Agency, (Special Publ. ESA SP 2003, 2003 (540), 589-594.

Chernik, V. N.; Novikov, L. S.; Bondarenko, G. G.; Gaidar, A. I.; Smirnova, T. N. Study of Polymeric Fiber Erosion under Oxygen Plasma Beams. Bull. Russ. Acad. Sci. Phys. 2010, 74 (2), 268-271. https://doi.org/10.3103/S1062873810020346.

Banks, B. A.; Snyder, A.; Miller, S. K.; Demko, R. Issues and Consequences of Atomic Oxygen Undercutting of Protected Polymers in Low Eerth Orbit. Prot. Mater. Struct. from Sp. Environ. 2006, No. Apr. 2002, 235-243. https://doi.org/10.1007/1-4020-2595-5_18. Retrieved from: https://www.researchgate.net/publication/227272558.

Suliga, A.; Jakubczyk, E. M.; Hamerton, I.; Viquerat, A. Analysis of Atomic Oxygen and Ultraviolet Exposure Effects on Cycloaliphatic Epoxy Resins Reinforced with Octa-Functional POSS. Acta Astronaut. 2018, 142, 103-111. https://doi.org/10.1016/j.actaastro.2017.10.018. Retrieved from https://www.researchgate.net/publication/320647577.

Gudimenko, Y.; Ng, R.; Kleiman, J.; Iskanderova, Z.; Milligan, D.; Tennyson, R. C.; Hughes, P. C. Enhancement of Space Durability of Materials and External Components through Surface Modification. J. Spacecr. Rockets 2004, 41, 326-334.

Verker, R.; Grossman, E.; Eliaz, N. Erosion of POSS-Polyimide Films under Hypervelocity Impact and Atomic Oxygen: The Role of Mechanical Properties at Elevated Temperatures. Acta Mater. 2009, 57, 1112-1119.

Kimoto, Y.; Ichikawa, S.; Miyazaki, E.; Matsumoto, K.; Ishizawa, J.; Shimamura, H.; Yamanaka, R.; Suzuki, M. Space Environment Effects on Materials at Different Positions and Operational Periods of ISS. AIP Conf. Proc. 2009, 1087, 207-211.

Zhao, Y.; Li, G. M.; Dai, X. M.; Liu, F. F.; Dong, Z. X.; Qiu, X. P. AO-Resistant Properties of Polyimide Fibers Containing Phosphorous Groups in Main Chains. Chinese J. Polym. Sci. English Ed. 2016, 34, 1469-1478.

Liu, F.; Guo, H.; Zhao, Y.; Qiu, X.; Gao, L. Enhanced Resistance to the Atomic Oxygen Exposure of POSS/Polyimide Composite Fibers with Surface Enrichment through Wet Spinning. Eur. Polym. J. 2018, 105, 115-125.

Qian, M.; Xuan, X. Y. Hyperthermal Atomic Oxygen Durable Transparent Silicon-Reinforced Polyimide. High Perform. Polym. 2019, 31(7), 831-842.

(56) References Cited

OTHER PUBLICATIONS

Watson, K. A.; Ghose, S.; Lillehei, P. T.; Smith, J. G.; Connell, J. W. Effect of LEO Exposure on Aromatic Polymers Containing Phenylphosphine Oxide Groups. AIP Conf. Proc. 2009, 1087, 291-299.

Smith, J. G.; Connell, J. W.; Hergenrother, P. M. Oxygen Plasma Resistant Phenylphosphine Oxide-Containing Poly (Arylene Ether)S. Polymer (Guildf). 1994, 35, 2834-2839.

Connell, J. W.; Jrt, J. G. S. Oxygen Plasma-Resistant Phenylphosphine Oxide-Containing Polyimides and Poly (Arylene Ether Heterocycle) S: 2. Polymer 1995, 36, 13-19.

Schuler, P.; Haghighat, R.; Mojazza, H. Space Durable Polymer Threads. High Perform. Polym. 2016, 11, 113-121.

He, Y.; Suliga, A.; Brinkmeyer, A.; Schenk, M.; Hamerton, I. Atomic Oxygen Degradation Mechanisms of Epoxy Composites for Space Applications. Polym. Degrad. Stab. 2019, 166, 108-120.

Huang, M.; Li, S.; Dong, Z.; Feng, W. E. I.; Wang, X.; Gu, S. Oxygen Enrichment from Air Through Multilayer Thin Lowdenstiy polyethylene films. Appl. Poly. Sci. 2002, 83, 3013-3021.

Zhang, H.; Xu, M.; Li, B. Synthesis of a Novel Phosphorus-Containing Curing Agent and Its Effects on the Flame Retardancy, Thermal Degradation and Moisture Resistance of Epoxy Resins. Polym. Adv. Technol. 2016, 27, 860-871.

Yasemin, A.; Doğan, M.; Bayramli, E. The Effect of Red Phosphorus on the Fire Properties of Intumescent Pine Wood Flour-LDPE Composites Yasemin. Fire Mater. 2016, 40, 697-703.

Riley, D. J. No Title, Virginia Polytechnic Institute, 1997.

Zheng, N.; He, J.; Gao, J.; Huang, Y.; Besenbacher, F.; Dong, M. Adhesion Force Measured by Atomic Force Microscopy for Direct Carbon Fiber-Epoxy Interfacial Characterization. Mater. Des. 2018, 145, 218-225.

Kizilkaya, C.; Karatas, S.; Apohan, N.-K.; Gungor, A. Synthesis and Characterization of Novel Polyimide/SiO2 Nanocomposite Materials Containing Phenylphosphine Oxide via Sol-Gel Technique. J. Appl. Polym. Sci. 2010, 115, 3256-3264.

Mccarthy, C. E.; Banks, B. A.; De Groh, K. K . . . MISSE 2 PEACE Polymers Experiment Atomic Oxygen Erosion Yield Error Analysis. 2010, No. November.

Musto, P.; Ragosta, G.; Russo, P.; Mascia, L. Thermal-Oxidative Degradation of Epoxy and Epoxy-Bismaleimide Networks: Kinetics and Mechanism. Macromol. Chem. Phys. 2001, 202, 3445-3458.

Banks, B. A.; Kneubel, C. A.; Miller, S.K . . . Atomic Oxygen Energy in Low Frequency Hyperthermal Plasma Ashers. 2014, No. November. Retrieved from https://www.researchgate.net/publication/269102661.

Liu, B.; Ji, M.; Liu, J.; Fan, L.; Yang, S. Phenylphosphine Oxide Containing Polyimide Matrix Resins for Atomic Oxygen-Resistant Fiber-Reinforced Composites. High Perform. Polym. 2013, 25, 907-917.

Lei, X. F.; Qiao, M. T.; Tian, L. D.; Yao, P.; Ma, Y.; Zhang, H. P.; Zhang, Q. Y. Improved Space Survivability of Polyhedral Oligomeric Silsesquioxane (POSS) Polyimides Fabricated via Novel POSS-Diamine. Corros. Sci. 2015, 90, 223-238.

Wei, J. H.; Gang, Z. X.; Ming, L. Q.; urRehman, S.; Wei, Z. H.; Dong, D. G.; Hai, C. C. Atomic Oxygen Resistant Phosphorus-Containing Copolyimides Derived from Bis [4-(3-Aminophenoxy)-Phenyl] Phenylphosphine Oxide. Polym. Sci. Ser. B 2014, 56, 788-798.

Brunsvold, A.; Minton, T.; Gouzman, I.; Grossman, E.; Gonzalez, R. An Investigation of the Resistance of Polyhedral Oligomeric Silsesquioxane Polyimide to Atomic-Oxygen Attack. High Perform. Polym. 2016, 16, 303-318.

Fuchs, W., Atomic Oxygen Resistant Low Earth Orbit Stable Polymer Matrix Composites Employing Phenylphosphine Oxide Epoxy-Amines. Dissertation 2021. Retrieved from.

Atomic Oxygen Protections in Polymeric Systems: A Review. The Journal of Space Technology and Science vol. 18 1_34-1_48 (2002).

Gonzalez, R. Synthesis and In-Situ Atomic Oxygen Erosion Studies of Space Survivable Hybrid Organic/Inorganic Polyhedral Oligomeric Silsesquioxane Polymers. 202 (2002).

\* cited by examiner

PHENYLPHOSPHINE OXIDE AND OXYGEN STABLE EPOXY POLYMERS AND METHODS OF SYNTHESIS

CROSS-REFERENCE TO RELATED APPLICATION

This application claims priority to U.S. Application No. 63/068,730 to Witold K. Fuchs et al. filed on Aug. 21, 2020, the contents of which are incorporated herein by reference in their entirety.

FIELD

The present subject matter generally relates to phenylphosphine oxide and oxygen stable epoxy polymers and methods of synthesis for said polymers.

BACKGROUND

Typical polymeric materials are subject to atomic or atmospheric oxygen (AO) exposure or degradation, such as when the polymeric materials are used in low Earth orbit (LEO) applications. This can be seen particularly in spacecraft applications. Current polymers require secondary coatings such as aluminum oxide, silicon dioxide, tin oxide, or indium tin oxide base, to protect against AO degradation. This second coating can be expensive and such coatings suffer from flaws, such as mismatched coefficients of thermal expansion, which can lead to cracking during thermal cycling, lessening the effectiveness of the secondary coatings.

BRIEF DESCRIPTION

According to some aspects of the present disclosure, a phenylphosphine oxide epoxy-amine composition includes a phenylphosphine oxide diamine monomer; and a phenylphosphine oxide epoxide monomer crosslinked with the phenylphosphine oxide diamine monomer, wherein said composition has at least about 8 percent by weight phosphorous concentration.

According to some aspects of the present disclosure, a layered structure includes a substrate and a skin cured onto a surface of the substrate, wherein the skin is formed of a phenylphosphine oxide epoxy-amine having a composition of greater than about 8% phosphorus by weight.

According to some aspects of the present disclosure, a method of forming a layered structure including a phenylphosphine oxide epoxy polymer film includes synthesizing a phenylphosphine oxide epoxide and synthesizing a phenylphosphine oxide diamine. The method also includes synthesizing a phenylphosphine oxide epoxy-amine using the phenylphosphine oxide epoxide and the phenylphosphine oxide diamine. The method includes forming a film using the phenylphosphine oxide epoxy-amine, preparing and debulking a CFRP composite panel, and co-curing the film with the CFRP composite panel.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
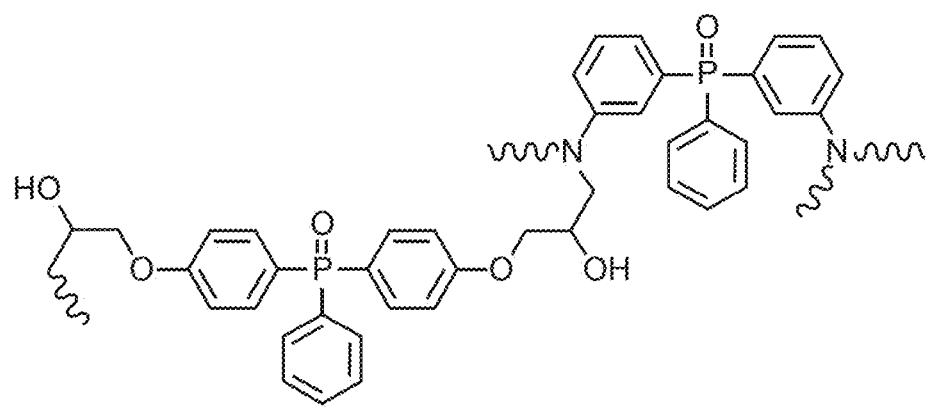
FIG. 1 illustrates a structure of a polymer including at least one phenylphosphine oxide epoxide combined with at least one phenylphosphine oxide amine.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to a phenylphosphine oxide (PPO) epoxy-amine polymer formed of at least one phenylphosphine oxide functional epoxide and at least one phenylphosphine oxide amine. The epoxide and the amine may be crosslinked to form the polymer such that the polymer has high phosphorous concentrations (P) by weight. For example, the polymer may have phosphorous concentrations of at least about 8 percent by weight (wt %), at least about 8.5 percent by weight, or any value or range of values therebetween. In other examples, the polymer may have a phosphorous concentration from about 5 percent by weight to about 20 percent by weight, about 7 percent by weight to about 10 percent by weight, or any value or range of values therebetween.

Figure 2:
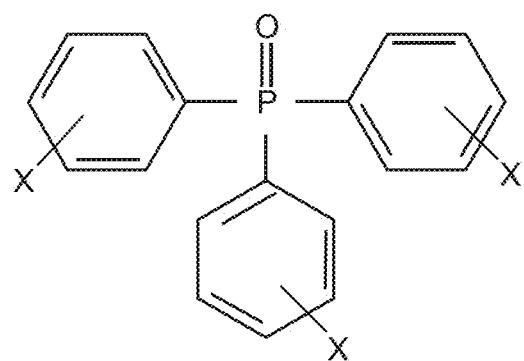
FIG. 2 illustrates an exemplary structure of a triphenyl phosphine oxide epoxy.
Figure 3A:
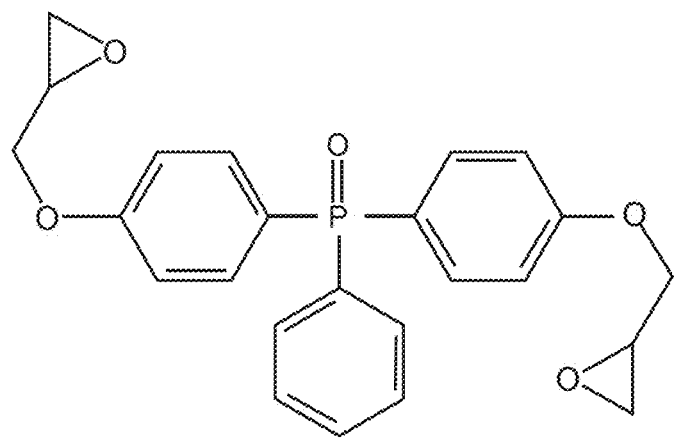
FIG. 3A illustrates an exemplary structure of a phenylphosphine oxide epoxide.
Figure 3B:
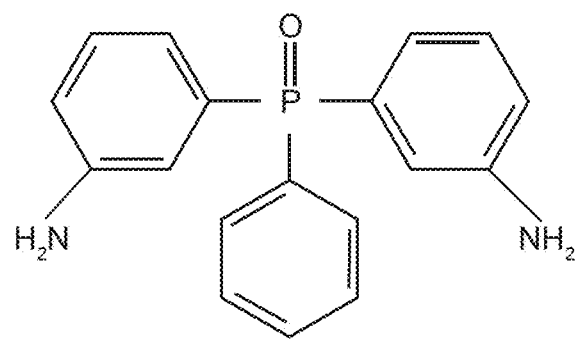
FIG. 3B illustrates an exemplary structure of a phenylphosphine oxide amine.

Referring now to FIG. 1, the structure of the disclosed polymer is illustrated as incorporating triphenyl phosphine oxide epoxies. Specifically, when formed, the disclosed polymer incorporates triphenyl phosphine oxide epoxies employed as AO stable polymers. Triphenyl phosphine oxide epoxies are understood to encompass compounds having the structure shown in FIG. 2, where each of the aryl groups can be substituted or unsubstituted and at least one of the phenyl groups contains epoxide or epoxide-reactive substituents (shown as X in FIG. 2). It will be understood that epoxide-reactive substituents as referenced herein include active hydrogen and may include amine (—NH$_2$), hydroxyl (OH), carboxy (—COOH), anhydride, and/or thiol (—SH) moieties Referring again to FIG. 1, in at least one example, the polymer is formed of a phenylphosphine oxide epoxide and a phenylphosphine oxide amine. The phenylphosphine oxide amine is configured to act as the curative for forming the polymer. For example, as shown in FIG. 3A, the epoxide may be bis-4-glycidylethertriphenylphosphine oxide (4,4-BGE-tPPO). As shown in FIG. 3B, the amine may be bis-3-aminotriphenylphosphineoxide (3,3-BA-tPPO). The method of synthesizing each monomer and, subsequently, the polymer is described in more detail elsewhere herein.

Figure 4:
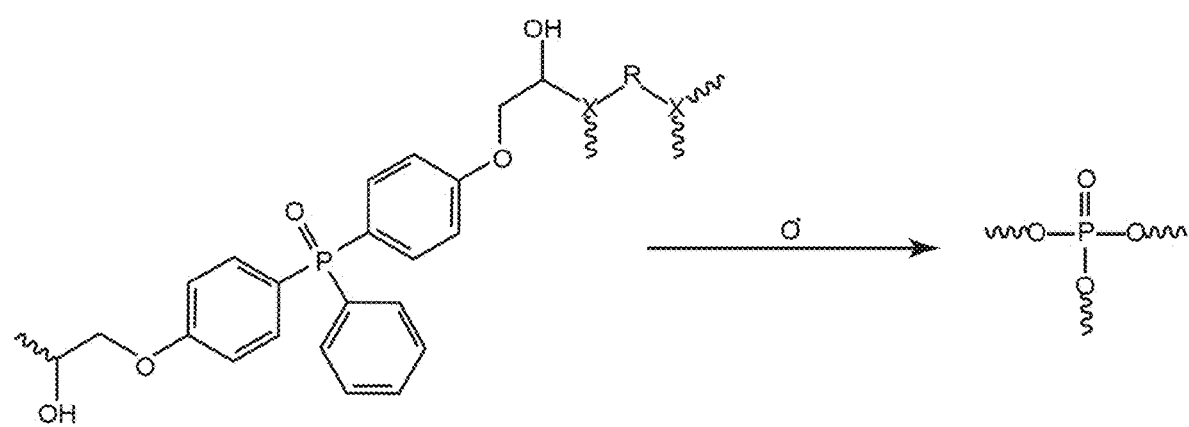
FIG. 4 illustrates the polymer of FIG. 1 forming passivating polyphosphate surface layers in response to atomic oxygen exposure, where R represents phenylphosphine oxide amine and X represents epoxide or epoxide-reactive substituents.
Figure 5A:
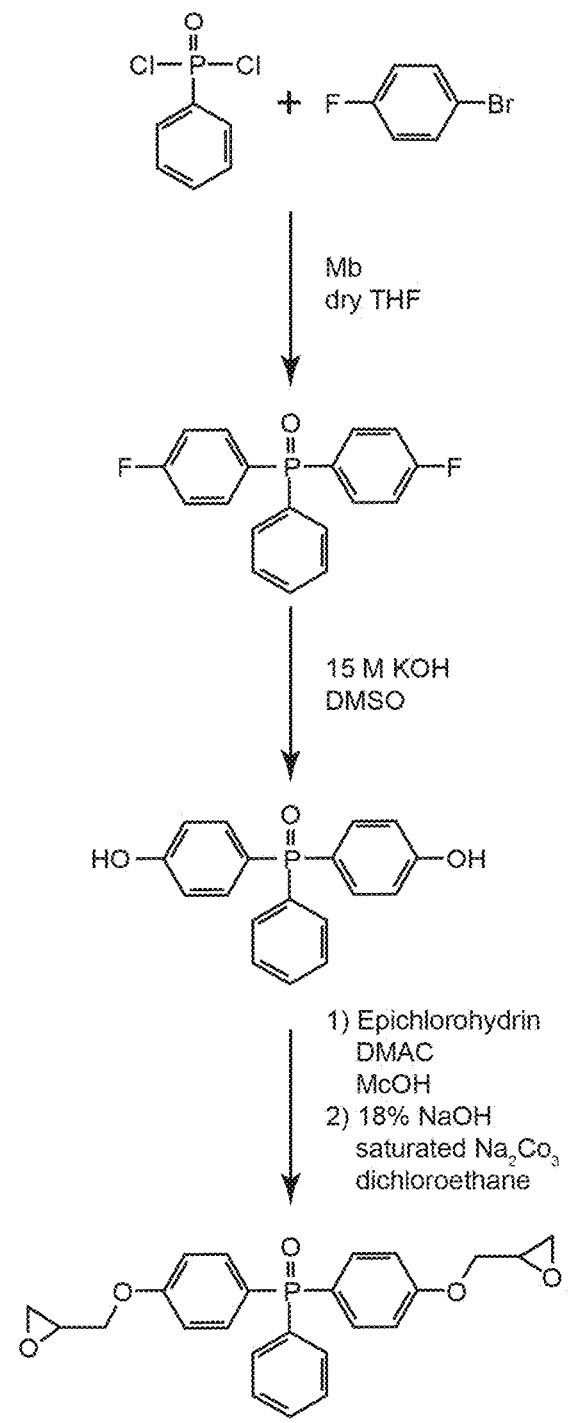
FIG. 5A is a diagram of synthesizing a phenylphosphine oxide epoxide.
Figure 5B:
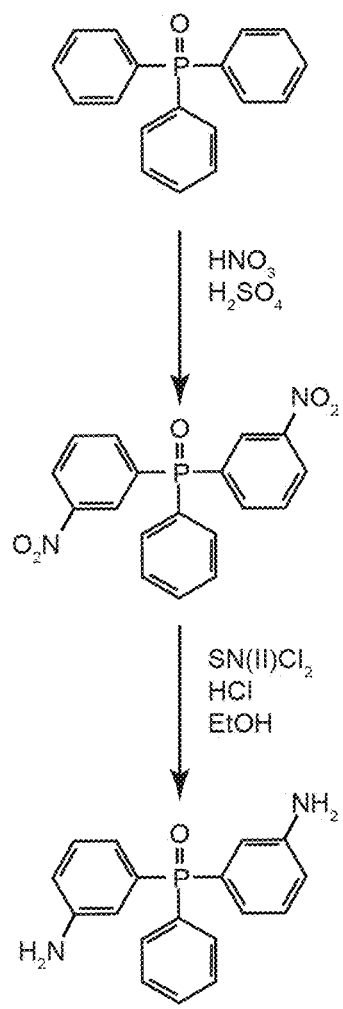
FIG. 5B is a diagram of synthesizing a phenylphosphine oxide diamine.

By synthesizing the disclosed polymer from a phenylphosphine oxide epoxide and a phenylphosphine oxide amine, the molecular weight between the reaction sites may be reduced. The reduction in molecular weight allows the disclosed polymer to have a phosphorus content of at least about 8 percent by weight, at least about 8.5 percent by weight, or any value or range of values therebetween. In other examples, the polymer may have a phosphorous concentration from about 5 percent by weight to about 20 percent by weight, about 7 percent by weight to about 10 percent by weight, or any value or range of values therebetween without departing from the scope of the present disclosure. Concentrations of phosphorus at this level may reduce AO erosion of the polymers such as the AO erosion that is experienced in LEOs. AO degradation is a serious degradative mechanism for epoxies in LEO. However, because the phenylphosphine oxide functional epoxies are AO stable or resistant epoxy polymers, the disclosed polymer forms passivating polyphosphate surface layers in response to or in the presence of AO exposure, as shown in FIG. 4. Polymer chains with incorporated PPO groups, such as the disclosed polymer, may also offer protection from AO by self-regenerating methods.

In one example, a bisglycidyl PPO (4,4-BGE-tPPO) and a diamine PPO (3,3-BA-tPPO) were prepared. The prepared monomers, along with tetraglycidylmethylene dianiline (TGDDM), diglycidylether bisphenol-A (DGEBA), and 3,3-diaminodiphenylsulfone (3,3-DDS) may be polymerized to prepare PPO epoxy-amines with phosphorous contents of at least about 8 percent by weight, at least about 5 percent by weight, from about 5 percent by weight to about 20 percent by weight, from about 7 percent by weight to about 10 percent by weight, or any value or range of values therebetween.

Each monomer (at least one phenylphosphine oxide epoxide and at least one phenylphosphine oxide diamine) was synthesized as outlined below. For each monomer synthesized, nuclear magnetic resonance (NMR) spectroscopy was conducted on a Bruker Ascend 600 MHz spectrometer for $^1$H NMR and $^{31}$P NMR with tetramethylsilane as an internal standard. Fourier transform infrared spectroscopy (FT-IR) was carried out on a PerkinElmer Frontier spectrometer with the scanning wavenumber in range of 400-4000 cm$^{-1}$ at 32 scans.

Synthesis of Epoxide Monomer

When preparing the monomers for polymerization of the PPO epoxy-amine polymer described herein, the PPO epoxide (4,4-BGE-tPPO) may be prepared using Grignard chemistry with a fluorinated precursor approach due to its cost-effectiveness and high yield. Epoxidization of the resultant bisphenol afforded the desired 4,4-BGE-tPPO monomer with high yield (89%). Precautionary measures may be taken to not heat the monomer higher than 90° C. because homopolymerization may be observed at higher temperatures.

The epoxide monomer bis-4-glycidylethertriphenylphosphine oxide (4,4-BGE-tPPO) is synthesized by first synthesizing bis-4-fluorotriphenylphosphine oxide (4,4-BF-tPPO), which is the precursor to 4,4-BGE-tPPO. To a 1000 mL three-neck round-bottom flask equipped with a mechanical stirrer, addition funnel, condenser, and N2 inlet/outlet, magnesium turnings (about 20.91 g or about 0.86 mols) are dissolved in dry THF (about 700 mL) as much as possible overnight. The following day, 4-bromofluorobenzene (about 150 g, about 0.86 mols, or about 2 eq.) is transferred to an addition funnel and added over three hours, maintaining the solution at about −5° C. The solution is then stirred for three hours. To this solution mixture, phenylphosphonic dichloride (about 83.56 g, about 0.43 mols, or about 1 eq.) is added dropwise through an addition funnel. After addition the solution is heated to about 50° C. and stirred overnight. The following day about 10% aqueous sulfuric acid is added to acidify the mixture, and the solution is diluted with deionized water. Diethyl ether is added in order to separate the solution into organic and aqueous phases. The organic layer is collected by extraction, and the aqueous layer is extracted diethyl ether and THF solvent mixture. The collected organic phase is dried over MgSO$_4$ and rotary evaporated to afford a viscous liquid. The crude product is recrystallized from a 50/50 solution of hexanes and toluene to a yield of about 96%. $^1$H NMR 600 MHz (DMSO-d$_6$): δ 7.44H ddd, δ 7.52H dddd, δ 7.6-7.754H ddd, 2H dtd, 1H tt. $^{31}$P NMR 600 MHz (DMSO-d$_6$): δ 24.96 1P s. (SI. 1)

Bis-4-hydroxytriphenylphosphine oxide (4,4-BH-tPPO) is then synthesized. 4,4-BF-tPPO (about 40 g or about 0.12 mols) is charged with distilled DMSO (about 150 mL) and 15 M KOH (about 80 mL) into a 500 mL three-neck round-bottom flask equipped with a mechanical stirrer, refluxing condenser, and N$_2$ inlet outlet. The reaction mixture is refluxed for about eight hours at about 130° C. Over the reaction duration, the color of the mixture gradually changes from white to clear to pink to clear yellow. After the reaction cools, the mixture is poured into DI H$_2$O and titrated to pH 3 using dilute HCl. The resulting white precipitate is filtered through an acid resistant filter paper and dried overnight. The product is then recrystallized from an 80/20 mixture of MeOH/DI H$_2$O to give a yield of about 91%. $^1$H NMR 600 MHz (DMSO-d$_6$): δ 6.8 4H ddd; δ 7.44H ddd; δ 7.5-7.62H dddd, 2H dddd, 1H tt; δ 10.22H s. $^{31}$P NMR 600 MHz (DMSO-d$_6$): δ 25.1 1P s. (SI. 2)

The epoxide monomer polymerized to form the disclosed polymer (bis-4-glycidylethertriphenylphosphine oxide (4,4-BGE-tPPO)) is then synthesized from the 4,4-BH-tPPO. To a 1000 mL three-neck round-bottom flask equipped with a mechanical stirrer, refluxing condenser, addition funnel, and N$_2$ inlet/outlet, 4,4-BH-tPPO (about 51.85 g, about 0.17 mols, or about 1 eq.) is charged with epichlorohydrin (about 629.14 g, about 6.8 mols, or about 40 eq.) and about 30% benzyltrimethylammonium chloride in methanol and heated to about 70° C. for about 27 hours with moderate stirring. The intermediate is concentrated using reduced pressure. The intermediate is dissolved in about 225 mL of 1,2-dichloroethane and about 18% NaOH (about 13.6 g, about 0.34 mols, or about 2 eq.) in DI H$_2$O and saturated Na$_2$CO$_3$ is added dropwise at a rate of about two drops per second. The temperature of the reaction is increased to about 75° C. and is stirred vigorously for about five hours, then is cooled to ambient temperature. The product is then washed eight times with DI H$_2$O and concentrated using reduced pressure to give a yield of about 89% (HCC=0.064 wt %; EEW=230.97 g/eq). $^1$H NMR 600 MHz (DMSO-d$_6$): δ 6.84H ddd; δ 7.44H ddd; δ 7.5-7.62H dddd, 2H dddd, 1H tt; 810.22H s. $^{31}$p NMR 600 MHz (DMSO-d$_6$): δ 25.0 1P s. (SI. 3)

Synthesis of Diamine Monomer

When preparing the monomers for polymerization of the PPO epoxy-amine polymer described herein, the diamine monomer bis-3-aminotriphenylphosphineoxide (3,3-BA-tPPO) is synthesized by first synthesizing bis-3-nitrotriphenylphosphine oxide (3,3-BN-tPPO). To a 1000 mL three-neck round-bottom flask equipped with a magnetic stirrer, reflux condenser, addition funnel, and an N$_2$ inlet/outlet triphenylphopshine oxide (about 45.1 g, about 0.162 mol, or about 1 eq.) and about 200 mL of 96% sulfuric acid are added. The reagent is dissolved with vigorous stirring, and the reaction system is cooled to about −5° C. A solution of fuming nitric acid (about 20.35 g, about 0.323 mol, or about 2 eq.) in sulfuric acid (about 200 mL) is added dropwise, with care being taken to not allow the reaction to exceed 0° C. during addition. The reaction is stirred and allowed to react for about eight hours. The reaction mixture is then hydrolyzed over ice, extracted with chloroform, and washed with 3 M NaOH solution until neutralized. The solution is then concentrated using reduced pressure and recrystallized from absolute ethanol to give a yield of about 67%. $^1$H NMR 600 MHz (DMSO-d$_6$): δ 7.62H ddd; δ 7.752H dddd, 1H tt; δ 7.8 2H dddd; δ 8.22H ddd; δ 8.452H dt, δ 8.652H ddd. $^{31}$P NMR 600 MHz (DMSO-d$_6$): δ 25.1 1P s. (SI. 4)

Bis-3-aminotriphenylphosphine oxide (3,3-BA-tPPO) is then synthesized. A 500 mL three-neck round-bottom flask equipped with a magnetic stirrer and an N$_2$ inlet/outlet is charged with 3,3-BN-tPPO (about 10 g or about 0.03 mol) and anhydrous tin(II)chloride (about 90 g). A solution of about 100 mL fuming hydrochloric acid in about 200 mL of absolute ethanol is introduced into the flask and stirred at ambient temperature for about five hours. The solution is then concentrated under reduced pressure, neutralized with about 25% aqueous NaOH solution, re-dissolved in ethanol and filtered through celite to remove tin(II)chloride. The filtered product is extracted with chloroform, washed three times with deionized water, and concentrated to give a pure product with about 95% yield. $^1$H NMR 600 MHz (DMSO-$d_6$): 4H δ 5.454H dd; δ 6.6 2H ddd; δ 6.72H ddd, 1H tt; δ 6.82H ddd; δ 7.22H ddd; δ 7.52H dddd, δ 7.553H m. $^{31}$P NMR 600 MHz (DMSO-$d_6$): δ 25.2 1P s. (SI. 5)

Synthesis of Phenylphosphine Oxide Epoxy-Amine

Figure 9:
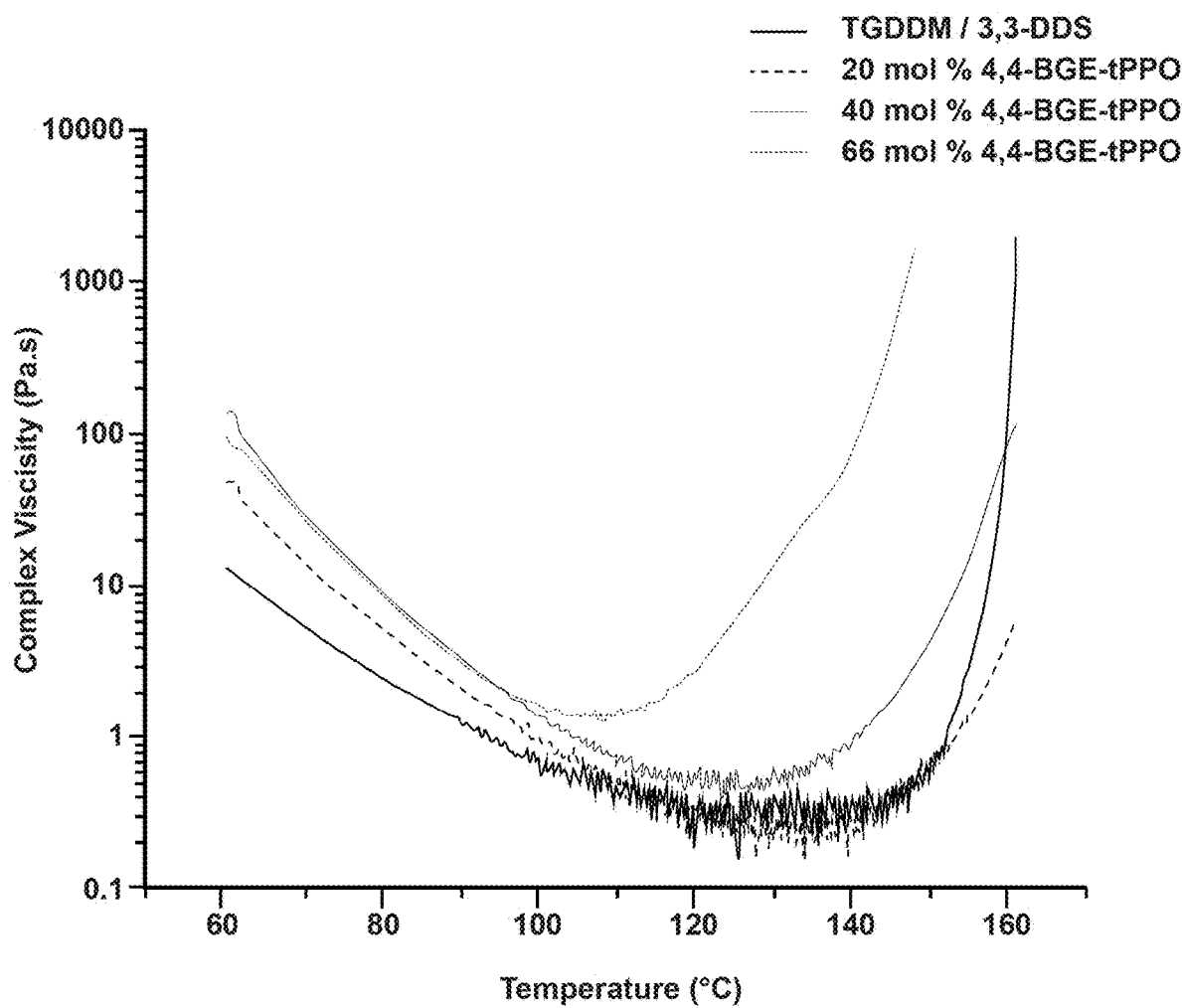
FIG. 9 is a graphical representation of the rheological characteristics of phenylphosphine oxide epoxy-amines, according to various examples.

The processing characteristics of the PPO epoxy-amines pose challenges that preclude traditional preparation methods for its application onto a CFRP composite panel. As shown in FIG. 9, the rheological characteristics of the PPO epoxy-amines generally illustrate an acceleration of the gelation behavior of the material as compared to other standard materials. Additionally, the PPO moiety acts as a Lewis base catalyst for the epoxy-amine polymerization.

Figure 6A:
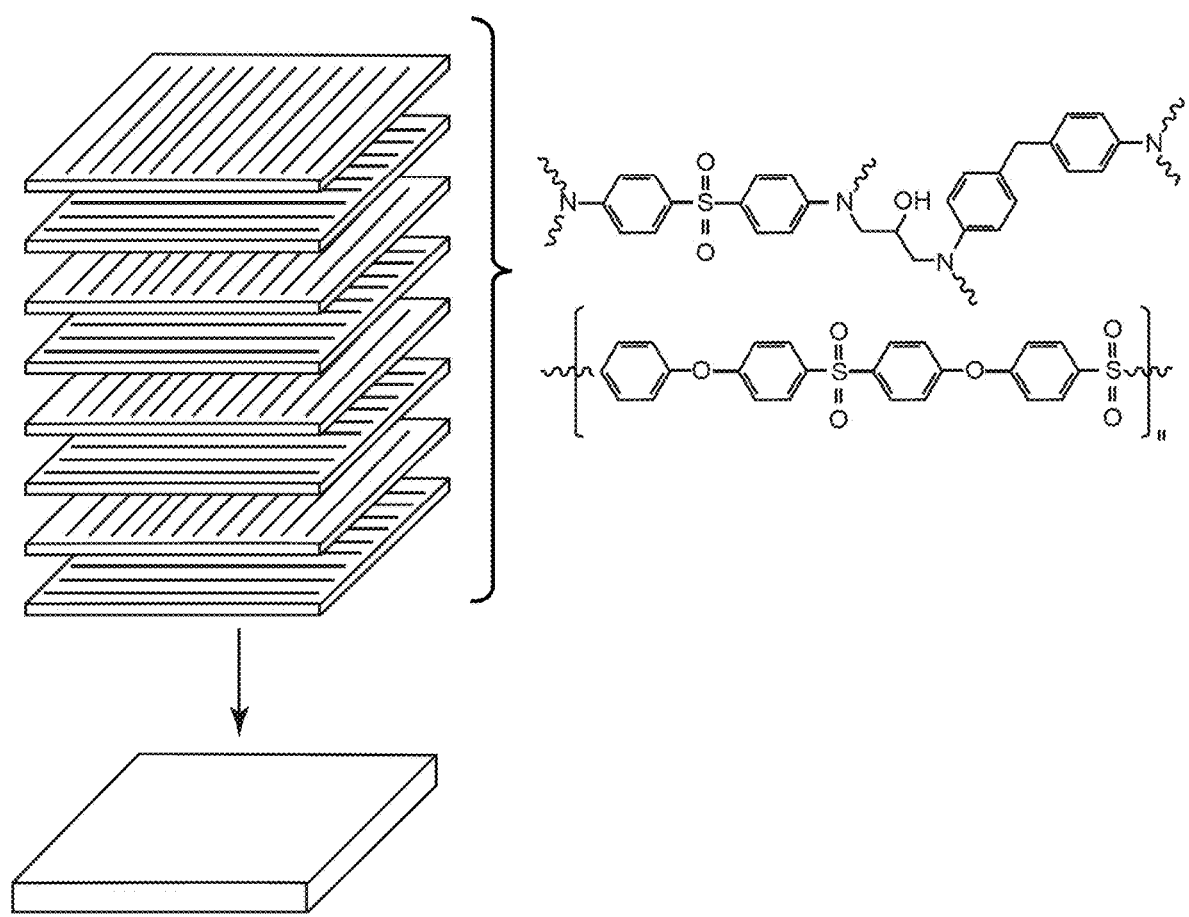
FIG. 6A is a diagram of a non-treated substrate assembly including carbon fiber composite panels and the corresponding chemical structure, according to various examples.
Figure 6B:
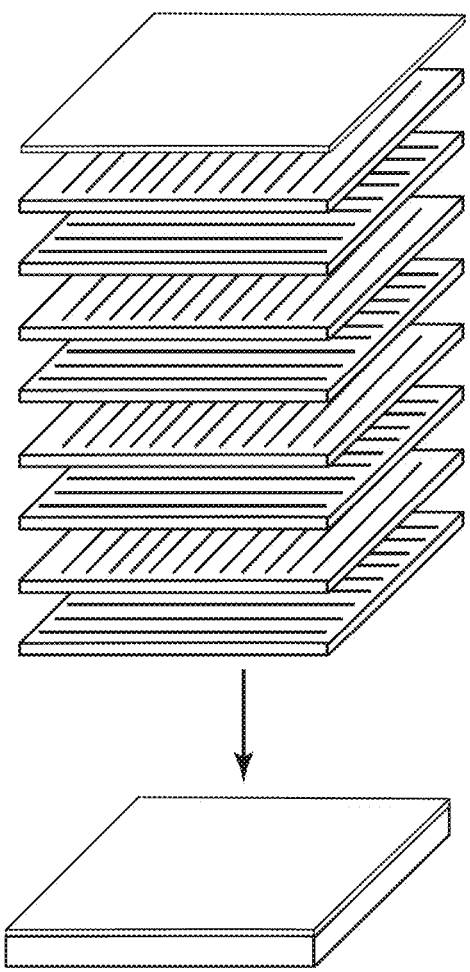
FIG. 6B is a diagram a treated substrate assembly including the polymer of FIG. 4 applied as a skin to the carbon fiber composite panels of FIG. 6A, according to various examples.

Methods of synthesis are described to apply a thin film of the PPO epoxy-amine onto a CFRP composite panel without significantly disrupting the CFRP preparation process. FIG. 6A generally illustrates the CFRP composite panel before and after curing. FIG. 6B illustrates the same CFRP composite panel before and after curing where the PPO epoxy-amine is co-cured with the CFRP composite panel as a thin film or skin. FIG. 6A further illustrates an exemplary composition of the CFRP composite panel. It will be understood that the CFRP composite panel of FIG. 6B has the same exemplary composition and the film has the composition of the PPO epoxy-amine illustrated in FIG. 1. It will be understood that the CFRP composite panel may be any composition having functional groups that are reactive with an oxide or a diamine without departing from the scope of the present disclosure.

Figure 7A:
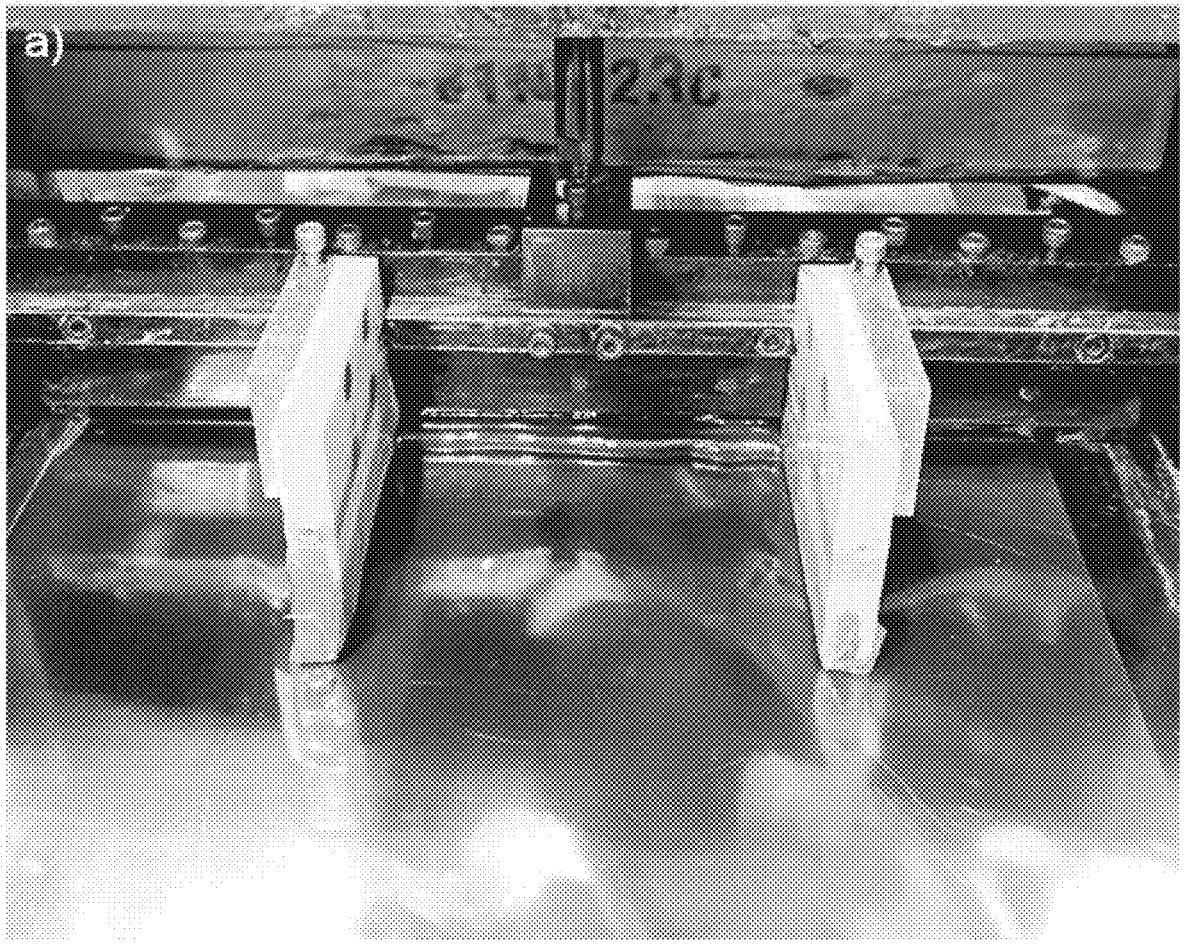
FIG. 7A illustrates a phenylphosphine oxide epoxy-amine prepolymer with 5 percent by weight volatile organic compounds in a resin dam during a film preparation process, according to various examples.
Figure 7B:
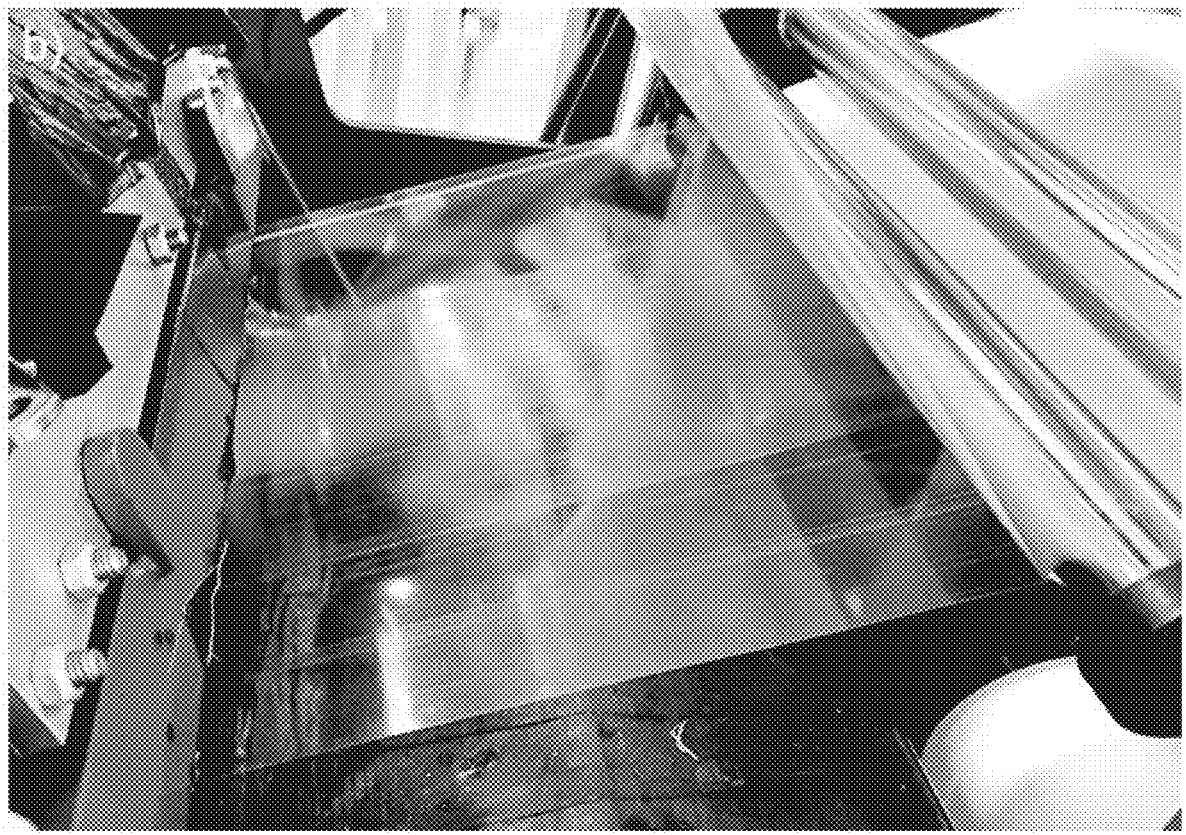
FIG. 7B illustrates a finished 6 g·m$^{-2}$ phenylphosphine oxide epoxy-amine film on a mylar backing.

In a first step of synthesizing the PPO epoxy-amine, the appropriate molar quantity of 3,3-BA-tPPO and 4,4-BGE-tPPO are dissolved in EtOH to result in a clarified solution with approximately 5 percent by weight remaining volatile organic compounds (VOC). The clarified solution is then cast into a 6 grams·m$^{-2}$ film using mylar backing and a traditional carbon fiber prepreg line. FIG. 7A shows the PPO epoxy-amine prepolymer with 5 wt % VOCs in resin dam during the film preparation process. FIG. 7B shows a finished 6 g·m$^{-2}$ film on Mylar backing.

Figure 8A:
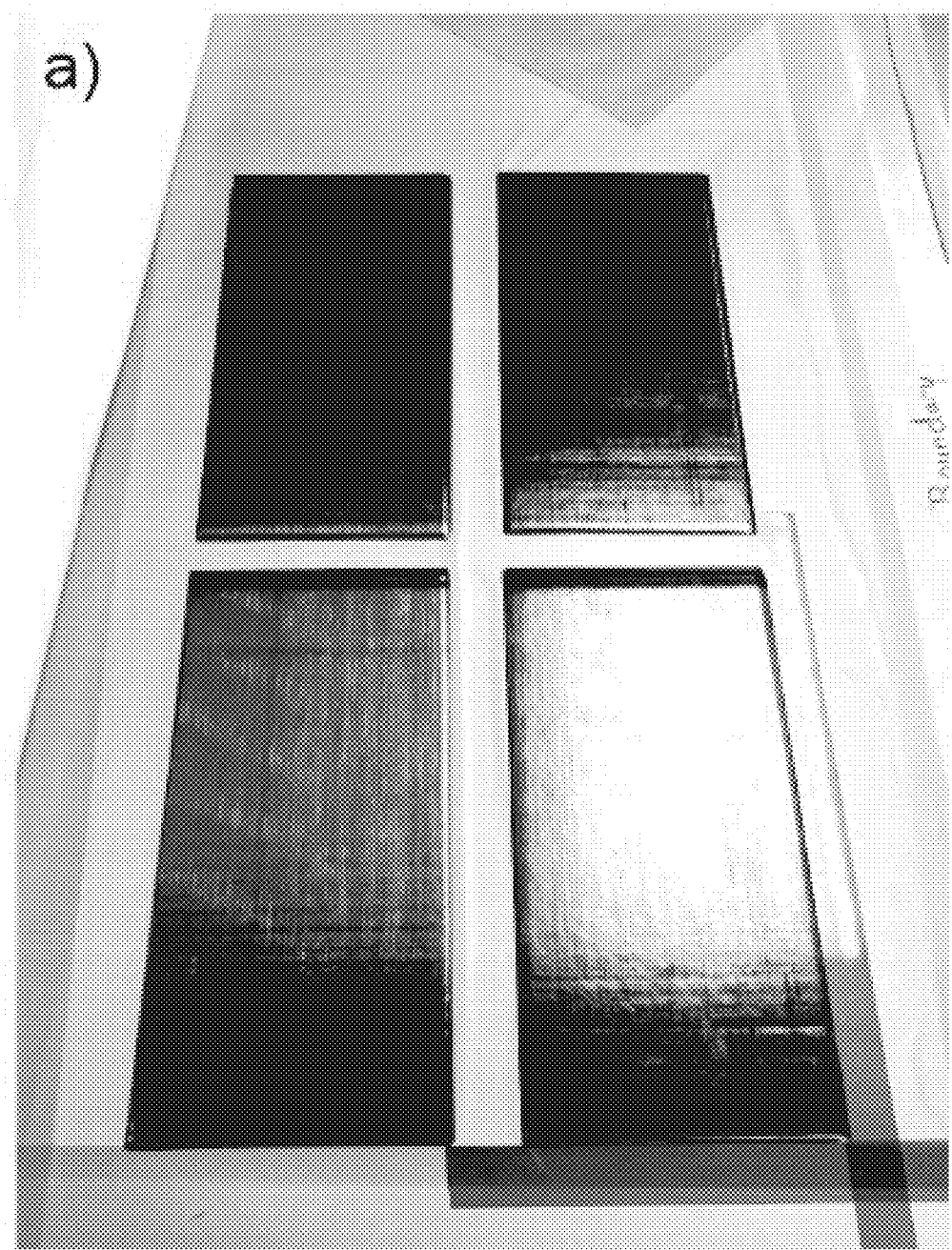
FIG. 8A illustrates debulked carbon fiber reinforced polymer (CRFP) composite panels.
Figure 8B:
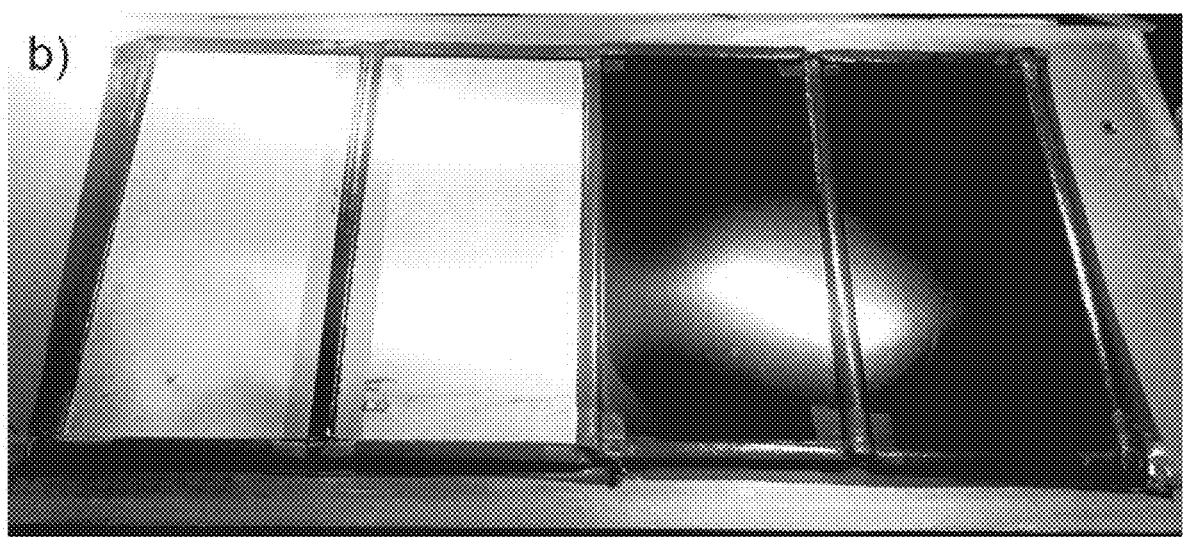
FIG. 8B illustrates the debulked CFRP composite panels of FIG. 8A after B-staging with a phenylphosphine oxide epoxy-amine skin applied and including caul plates in place.
Figure 8C:
FIG. 8C illustrates polymerized CFRP composite panels co-cured with the phenylphosphine oxide skin.

As shown in FIG. 8A, a CFRP composite panel is prepared and debulked using industry standard procedures. The debulked panel is then B-staged in an autoclave at 120° C. for two hours, as shown in FIG. 8B. The term B-staged generally indicates that the epoxy-amine has solidified. B-staging the panel is necessary to prevent bleed-through of the applied thin film into the matrix of the composite. The B-staged panel is then removed, and the PPO epoxy-amine thin film is applied. The mylar backing is not removed when the film is applied. The sample is then placed back into the autoclave and cured using the following thermal profile: 120-180° C. ramp at 1° C.·min$^{-1}$; 3 hour isothermal hold at 180° C. Upon completion of the autoclave cycle, the mylar backing is removed to result in a CFRP composite panel with a thin 'skin' of PPO epoxy-amine on one side. The term 'skin' is used as the thin film is covalently bound to the matrix of the CFRP, differentiating it from a coating. FIG. 8C shows the fully polymerized CFRP composite panels with the co-cured PPO skin. The novelty of the method and synthesis process lies at least in the retention of the full film after polymerization, as well as the minimal disruption to traditional CFRP preparation processes.

Exposure of the disclosed polymers to AO produces a passivation phosphate ($PO_x$) surface layer on the surface, while efficacy of the resultant layer was directly proportional and related to initial P concentration(s). Both the benzene rings and the higher levels of phosphorus content contribute to the formation of the passivation surface layers. Because of this passivation phosphate surface layer, the disclosed polymers do not exhibit linear erosion rates when exposed to AO, unlike most organic polymers. Moreover, the AO resistance of the polymers can be optimally tuned by synthesizing the polymers with varying concentrations of phosphorus.

EXAMPLES

To illustrate the properties of the PPO epoxy-amine polymer disclosed herein, thin films of PPO containing epoxies having varying compositions were exposed to AO via oxygen plasma ashing and characterized by film height loss, and x-ray photoelectron spectroscopy (XPS). Details of these tests of the disclosed polymer and the corresponding results are detailed below in Examples 1 and 2.

Samples of five epoxide-amine slurries with statistically varying phosphorus concentrations, as provided in Table 1 below, were prepared in triplicate for the tests outlined in Examples 1 and 2 detailed below. Each sample is identified by the molar ratio of the PPO monomer. The samples were heated to 120° C. and degassed for approximately 30 minutes prior to polymerization in a programmable oven. The temperature profile for polymerization was performed as follows: (a) ramp from 120° C. to 180° C. at a rate of 1° C.·min$^{-1}$, then (b) isothermal hold at 180° C. for 3 hours. Samples containing 3,3-BA-tPPO were prepared via a solvent based method described directly. The epoxide and diamine were dissolved in the minimum necessary amount of ethanol, then concentrated. The clarified epoxide-amine prepolymer was then cast into a mold, degassed, and polymerized as previously described. Sample sizes were kept constant at approximately 20 mm·5 mm·1 mm (l·w·h) when preparing the samples.

TABLE 1

Composition of prepared epoxy-amine polymers

| Sample identity | Epoxide/amine identity | Sample molar ratios | Calculated a [P] (wt %) | Experimental b [P] (wt %) |
|---|---|---|---|---|
| 0 - PPO | ------------------:TGDDM:3,3-DDS:--------------- | ----:1.0:1.0:--- | 0.00 | 0.00 ± 0.00 |
| 20 - PPO | 4,4-BGE-tPPO:TGDDM:3,3-DDS:--------------- | 1.0:2.0:2.5:--- | 1.64 | 1.18 ± 0.07 |
| 40 - PPO | 4,4-BGE-tPPO:TGDDM:3,3-DDS:--------------- | 2.0:1.0:2.0:--- | 3.51 | 3.08 ± 0.02 |
| 66 - PPO | 4,4-BGE-tPPO:-----------:3,3-DDS:--------------- | 2.0:----:1.0:--- | 5.67 | 5.41 ± 0.08 |
| 100 - PPO | 4,4-BGE-tPPO:-----------:----------:3,3-BA-tPPO | 2.0:----:----:1.0 | 8.06 | 7.78 ± 0.11 |

Example 1

Thermal analyses were performed on samples of the prepare epoxy-amine polymers of Table 1 using a TA instruments Q50 thermogravimetric analysis (TGA) instrument at a heating rate of 10° C.·min-1 with the temperature ranging from 25° C. to 800° C. under air, in triplicate. Triplicate samples of an epoxide monomer with similar functionality (DGEBA) and a diamine monomer with similar structure and isomerism (3,3-DDS) were also tested. Dynamic mechanical analyses (DMA) were performed on the samples using a TA instruments Q800 DMA in multi-frequency strain mode using a film tension clamp, in triplicate. Temperature ramp tests were performed using an oscillation amplitude of 15, a static force of 0.01 N, a force track of 125%, and a sampling interval of 2 pts·s$^{-1}$ from room temperature to 300° C. at a heating rate of 3° C.·min$^{-1}$. Tg values were obtained from the peak of the obtained tan δ curve.

TABLE 2

Thermal behavior of prepared phenylphosphine oxide epoxies

| Sample identity and [P] (Weight %) | T5% (° C.) | C600° C. (Weight %) | C800° C. (Weight %) | Tg (° C.) |
|---|---|---|---|---|
| ------------/DGEBA - 3,3 DDS | 403.32 ± 1.34 | 28.1 ± 0.2 | 1.4 ± 1.7 | 157.93 ± 0.99 |
| 0 - PPO/TGDDM - 3,3 DDS | 343.43 ± 0.67 | 38.9 ± 0.7 | 0.8 ± 0.5 | 232.97 ± 0.34 |
| 20 - PPO/1.64 wt % P | 336.79 ± 1.46 | 40.8 ± 1.2 | 4.9 ± 2.0 | 218.52 ± 0.59 |
| 40 - PPO/3.51 wt % P | 337.26 ± 1.28 | 41.4 ± 0.9 | 13.6 ± 1.9 | 212.54 ± 4.42 |
| 66 - PPO/5.67 wt % P | 355.02 ± 1.51 | 44.0 ± 2.0 | 24.1 ± 6.2 | 204.85 ± 0.98 |
| 100 - PPO/8.06 wt % P | 347.95 ± 5.08 | 43.8 ± 0.5 | 25. ± 2.7 | 201.92 ± 0.97 |

The glass transition temperatures ($T_g$) and thermal stabilities of the samples of the disclosed polymers were measured by DMA and TGA. The results of these measurements are set forth in Table 2 above. The influence of the 4,4-BGE-tPPO monomer on polymer $T_g$ and thermal stability is observable through the comparison to an epoxide monomer with similar functionality (DGEBA) and a diamine monomer with similar structure and isomerism (3,3-DDS). Further comparison with the high-performing TGDDM epoxide monomer illustrates the excellent thermal behavior of the prepared PPO epoxide and diamine monomers.

Epoxy-amines prepared using DGEBA-3,3 DDS and TGDDM-3,3 DDS were found to exhibit $T_g$'s of about 158° C. and about 233° C., respectively. Replacement of DGEBA with a stoichiometric equivalent of the 4,4-BGE-tPPO monomer (the DGEBA-3,3 DDS sample and Sample ID 66-PPO, respectively) was found to increase the resultant polymer $T_g$ by 47° C. (158° C. and 205° C., respectively). Subsequently, the effect of the 3,3-BA-tPPO monomer on epoxy-amine $T_g$ was compared to a stoichiometric equivalent of the 3,3-DDS monomer (Sample ID 100-PPO and Sample ID 66-PPO, respectively). The obtained $T_g$'s were concluded to be of negligible difference, with an observed disparity of 3° C. Based on these results, it can be concluded that epoxy monomers with a backbone triphenylphosphine oxide moiety (4,4-BGE-tPPO) significantly increased polymer $T_g$ relative to bisphenol-A based epoxy monomers (DGEBA).

The effect of 4,4-BGE-tPPO on epoxy-amine $T_g$ was further analyzed via comparisons to the high-performing epoxide monomer TGDDM. Epoxy-amines based on TGDDM and 3,3-DDS monomers are commonly used in rigorous aerospace applications. It was found that epoxy-amines prepared using the difunctional 4,4-BGE-tPPO monomer exhibited a $T_g$ value 32° C. lower $T_g$ compared to the tetrafunctional TGDDM (Sample ID 66-PPO and Sample ID 0-PPO, respectively). In contrast, the DGEBA-3,3 DDS epoxy-amine's $T_g$ was 75° C. lower than that of TGDDM-3,3 DDS. The prepared PPO epoxy-amines retained a $T_g$ above 200° C. This confirms the suitability of such polymers for high-temperature applications.

Example 2

Silicon wafers were cut into 1.5 cm×1.5 cm pieces and cleaned using the RCA procedure to remove organic residue and oxidize the surface of the wafer. The general recipe for RCA cleaning is 5 parts deionized (DI) water, 1 part 27% ammonium hydroxide, and 1 part 30% hydrogen peroxide. DI water and ammonium hydroxide were added to a beaker and heated to 70° C. for 5 min, and then the beaker was removed from heat and hydrogen peroxide was added. The silicon wafers were transferred to the beaker and heated at 70° C. for 15 min. After 15 min, the wafer was removed from the solution and washed multiple times with DI water. Clean substrates were stored in an oven at 120° C. before film spincasting.

Epoxide-amine solutions with statistically varying phosphorus concentrations (see Table 1) were prepared at concentrations of 0.15 g·mL$^{-1}$ in acetone. Solutions containing 3,3-BA-tPPO were prepared using ethanol. All solutions were filtered through a filter pipette to remove particulate matter prior to spincasting. Five drops of solution were deposited on prepared wafers and spincast using an acceleration of 2002 rpm·s$^{-1}$ with a top speed of 2000 rpm for 60 s.

Spincast films were dried at ambient conditions for 120 minutes, followed by drying under reduced pressure at ambient temperature for 120 minutes. Thin films were cured at 80° C. for 48 hours and the cure was monitored using FT-IR spectroscopy by observing the disappearance of epoxide peaks (912 cm$^{-1}$).

Thin film height measurements were performed using a Filmetrics interferometer with a refractive index of n=1.45. The AO exposure test was performed using a Diener zeptorie radio frequency oxygen plasma asher. AO fluence was calculated based on the mass loss of a reference Kapton™ H polyimide using the equation:

$$F = m/\rho AE$$

where F is the total AO fluence (O·atoms·cm$^{-2}$), m is the mass loss of Kapton® (g), ρ is the density of Kapton® (1.42 g·cm$^{-2}$), A is the surface area of the exposed Kapton® sample (cm$^2$), and E is the erosion constant of Kapton® (3·10$^{-24}$ cm$^3$·O·atom$^{-1}$).

The cumulative AO fluence received was compared to an equivalent duration in orbit based on the data from a mission on the International Space Station (ISS) launched on June 2001, when the sun entered a period of high activity. The total AO exposure during this period was quantified to be $3.28 \cdot 10^{21}$ O·atoms·cm$^{-2}$ for one year of exposure.

Figure 11A:
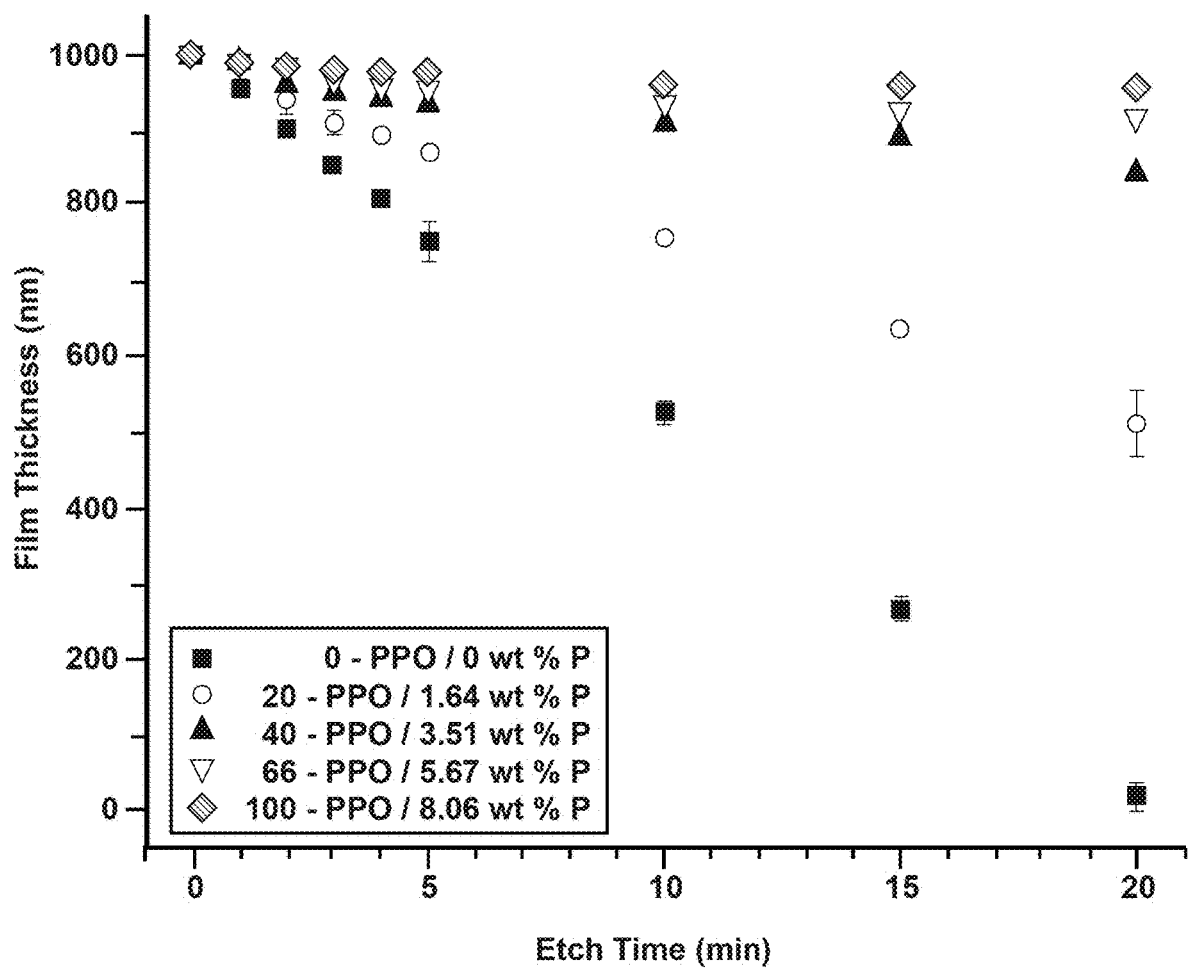
FIG. 11A is a graphical representation of phenylphosphine oxide epoxy-amine thin film surface erosion during AO exposure with a 20 min etch time equivalent to approx. $1 \cdot 10^{21}$ O·atoms·cm$^{-2}$.

The prepared samples were exposed to a total fluence of $2.88 \cdot 10^{21}$ O·atoms·cm$^{-2}$ over the course of one hour and the remaining thin film height was assessed after each incremental exposure. Thin films containing 0 wt % and 1.64 wt % phosphorus did not retain sufficient structural integrity to quantify their height beyond a 20 minute (9.6·1021 O·atoms·cm$^{-2}$) exposure. Instead, concurrently exposed macroscopic samples of dimensions 20 mm·5 mm·1 mm (l·w·h) were used for surface characterization. FIG. 11A is a graphical representation of PPO epoxy-amine thin film surface erosion during AO exposure with a 20 min etch time equivalent to approx. $1 \cdot 10^{21}$ O·atoms·cm$^{-2}$, and FIG. 11B dependence of [P] on erosion rate fitted with exponential line of best fit. For the graph of FIG. 11B, the oxygen plasma etch rate value obtained from slope of linear fit for a final 3 film thicknesses, and the best fit curve was calculated using OriginPro 8.5 software.

Figure 11B:
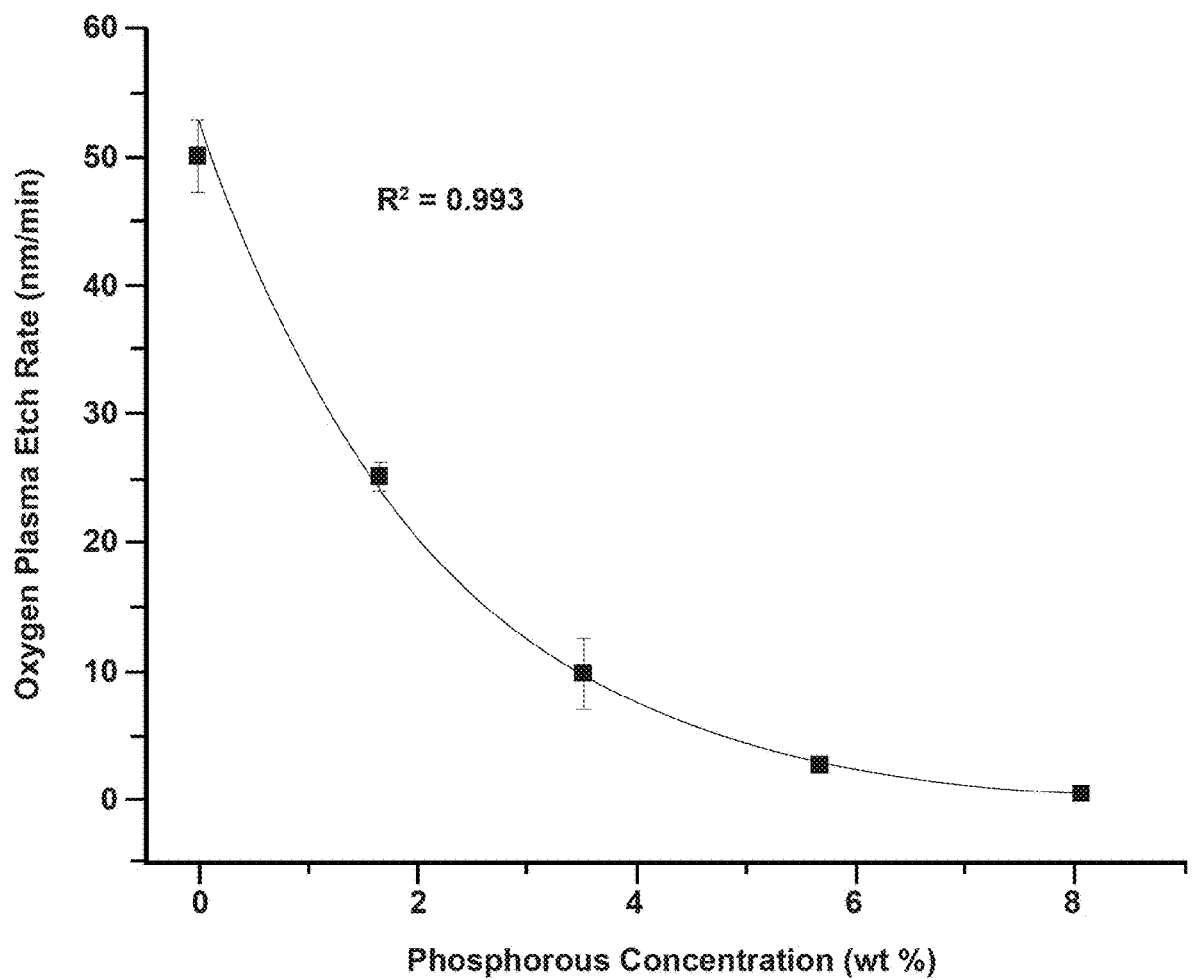
FIG. 11B is a graphical representation of dependence of phosphorous concentration on erosion rate fitted with exponential line of best fit.

Thin film height as a function of AO exposure time is shown in FIG. 11A. All samples demonstrated a loss in film height upon AO exposure, as shown in FIG. 11B. However, samples containing PPO exhibited non-linear erosion rates. Furthermore, increasing [P] resulted in significantly reduced erosion rates, as shown in FIG. 11A, with an exponentially decaying trend observed between initial [P] and oxygen plasma etch rate. The results demonstrate that a polymer's AO erosion rate continued to evolve at elevated above 5 wt % [P].

FIG. 11A suggests that a minimum of 3 wt % P is necessary to observe significant resistance to AO degradation. Further increasing [P] to 8.06 wt % improved the AO resistance 100-fold after a 60 minute AO exposure ($2.88 \cdot 10^{21}$ O·atoms·cm$^{-2}$) relative to the non-phosphorus containing epoxy-amine. The results illustrated in FIG. 11B suggest that polymers with [P] higher than 8 wt % may show diminishing returns regarding efficiency as the synthesis and processing of high [P] monomers is challenging due to their insolubility in most non-polar solvents, their high melting points, and high viscosities. It is will be understood that AO erosion rate of polymers also depends on the composition of the organic components, where aliphatic compounds degrade more readily than aromatic compounds, and, therefore, the precise erosion rates relative to [P] may vary according to polymer structure.

XPS experiments were using a ThermoFisher ESCALAB Xi+ spectrometer equipped with monochromatic Al X-ray source (1486.6 eV) and a MAGCIS Ar$^+$/Arn$^+$ gas cluster ion sputter (GCIS) gun. Measurements were performed using the standard magnetic lens mode and charge compensation. The base pressure in the analysis chamber during spectral acquisition was a $3 \cdot 10^{-7}$ mBar. Spectra were collected at a takeoff angle of 900 from the plane of the surface. The pass energy of the analyzer was set at 150 eV for survey scans with an energy resolution of 1.0 eV; total acquisition time was 220 s. Binding energies were calibrated with respect to C is at 248.8 eV. Sputter depth profiling was performed by rastering an argon ion beam in cluster mode (6 keV, Ar$_{300}^+$) over a 2 mm$^2$ area at an angle 30° to the sample normal. To avoid crater edge effects, an X-ray spot size of 650 m was employed. The X-ray gun was blanked during each argon sputtering step to minimize changes in composition due to X-ray exposure. All spectra were recorded using Thermo Scientific Advantage software; data files were translated to VGF format and processed using the Thermo Scientific Advantage package v5.9904.

Samples were analyzed via XPS to determine the effects of AO exposure on surface atomic composition, with the results of the XPS survey spectra reported in Table 3 below. Upon exposure to AO, the concentration of C decreased. This decrease is due to the oxidation of carbon-based moieties, where the final product is often a volatile compound.

TABLE 3

XPS surface analyses of prepared thin films before and after exposure to AO flux equivalent to $2.88 \cdot 10^{21}$ O• atoms · cm$^{-2}$.[a]

| Sample Identity | Calculated [P][b] (wt %) | Unexposed surface atomic weight % | | | Exposed surface atomic weight % | | |
|---|---|---|---|---|---|---|---|
| | | O1s | C1s | P2p | O1s | C1s | P2p |
| 0 - PPO | 0.0 wt % P | 32.49 ± 0.59 | 59.09 ± 0.49 | — | 40.10 ± 0.65 | 47.24 ± 0.28 | — |
| 20 - PPO | 1.64 wt % P | 28.10 ± 0.74 | 63.24 ± 1.13 | 1.18 ± 0.07 | 39.99 ± 0.87 | 38.50 ± 0.92 | 11.60 ± 0.77 |
| 40 - PPO | 3.51 wt % P | 27.97 ± 0.05 | 60.37 ± 0.06 | 3.08 ± 0.02 | 35.28 ± 0.07 | 45.62 ± 0.27 | 11.41 ± 0.29 |
| 66 - PPO | 5.67 wt % P | 24.54 ± 0.13 | 64.16 ± 0.12 | 5.41 ± 0.08 | 38.33 ± 0.27 | 39.42 ± 0.32 | 16.01 ± 0.15 |
| 100 - PPO | 8.06 wt % P | 23.56 ± 0.10 | 66.30 ± 0.20 | 7.78 ± 0.11 | 39.73 ± 0.59 | 41.09 ± 0.86 | 14.58 ± 0.29 |

[a]compositions obtained from surface XPS survey data (SI 7)[b] calculation based empirical formula of polymer structure A corresponding increase in [O] was observed in all samples from oxidation by AO. In PPO containing samples, an increase of [P] up to a maximum of 16.01 wt % was observed after AO exposure, which is indicative of passivation layer formation.

Figure 12A:
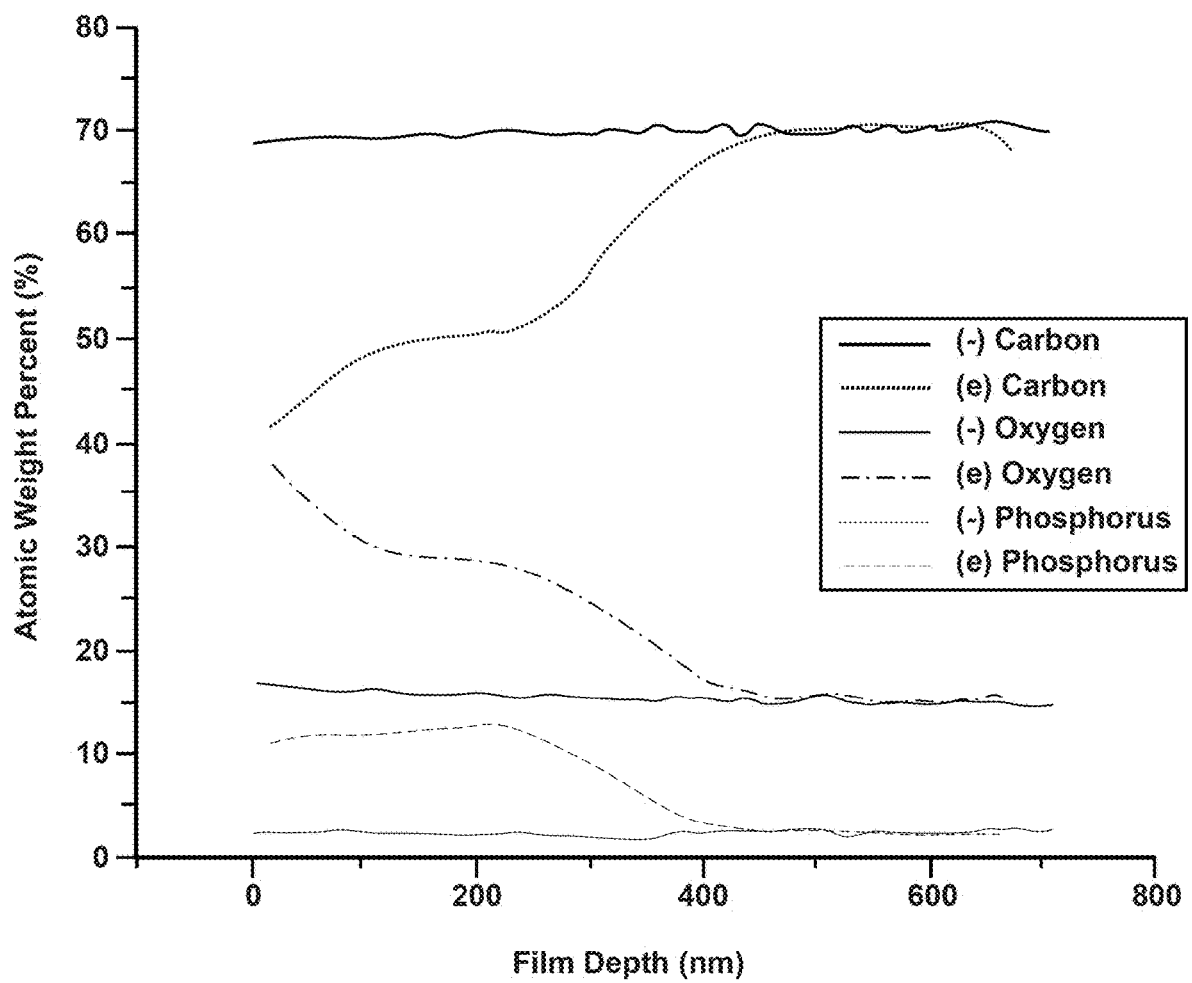
FIG. 12A is a graphical representation of compiled XPS depth profiles of a first sample of PPO epoxy-amines before (−) and after (e) exposure to an AO flux equivalent to $2.88 \cdot 10^{21}$ O·atoms·cm$^{-2}$.
Figure 12B:
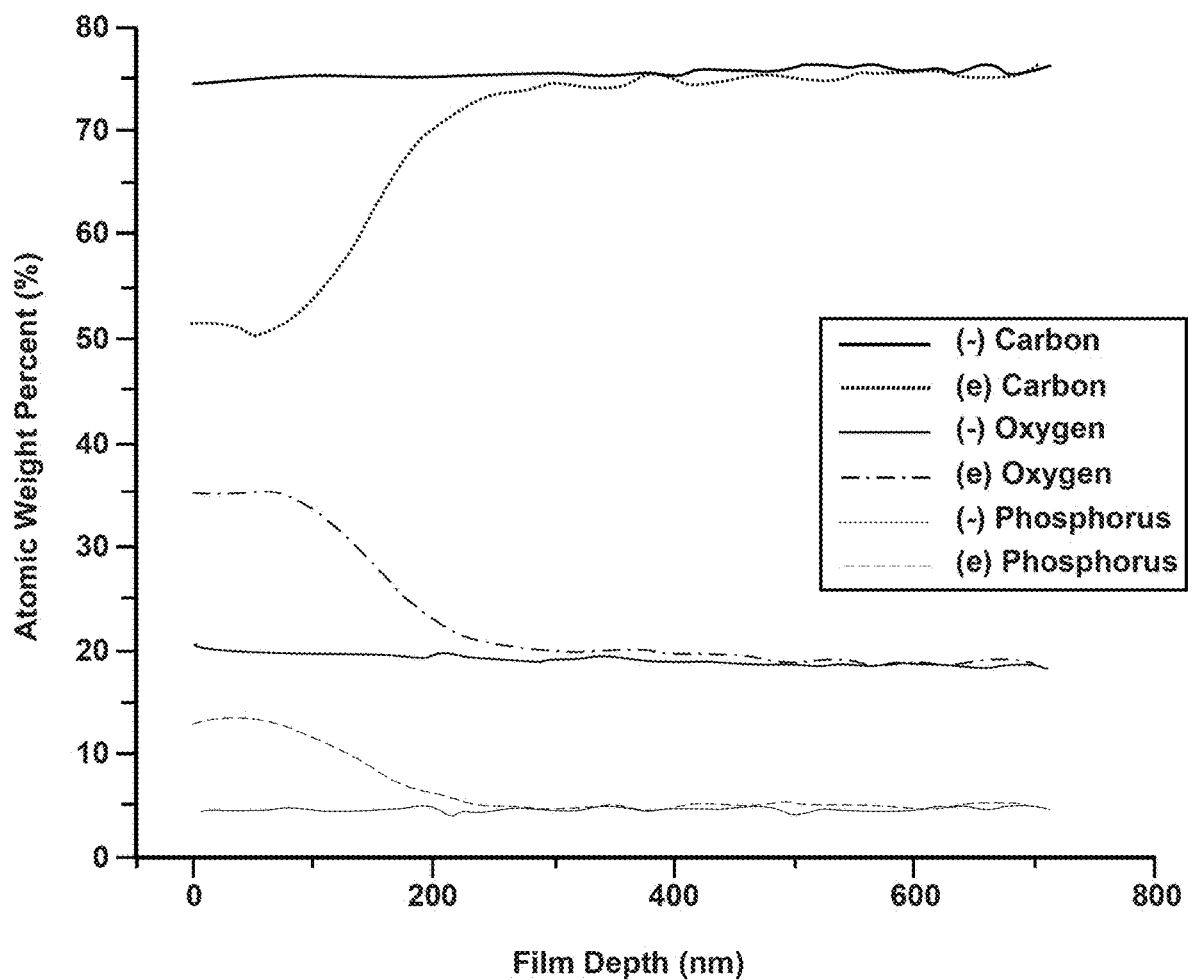
FIG. 12B is a graphical representation of compiled XPS depth profiles of a second sample of phenylphosphine oxide epoxy-amines before (−) and after (e) exposure to an AO flux equivalent to $2.88 \cdot 10^{21}$ O·atoms·cm$^{-2}$.
Figure 12C:
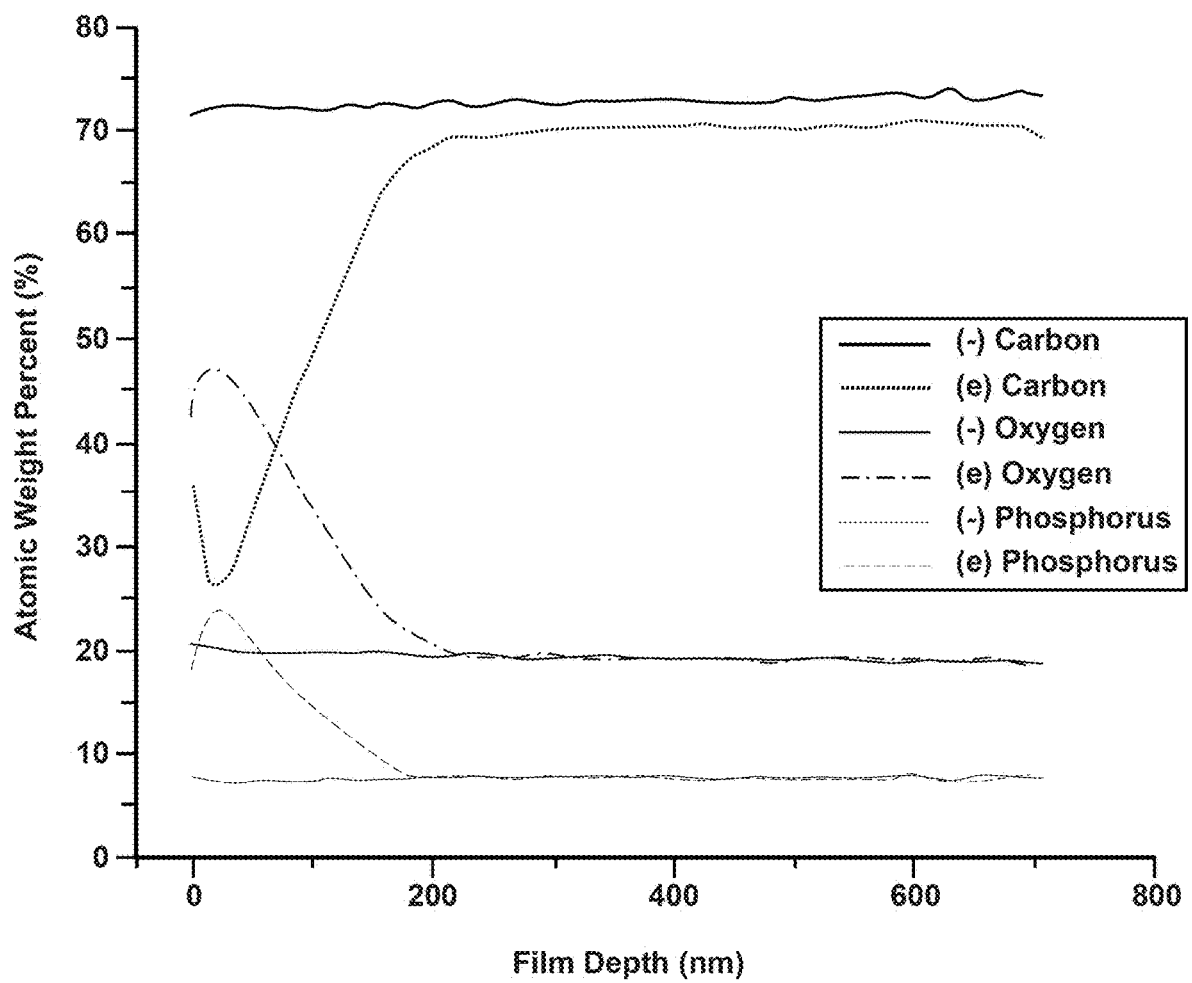
FIG. 12C is a graphical representation of compiled XPS depth profiles of a third sample of phenylphosphine oxide epoxy-amines before (−) and after (e) exposure to an AO flux equivalent to $2.88 \cdot 10^{21}$ O·atoms·cm$^{-2}$.
Figure 12D:
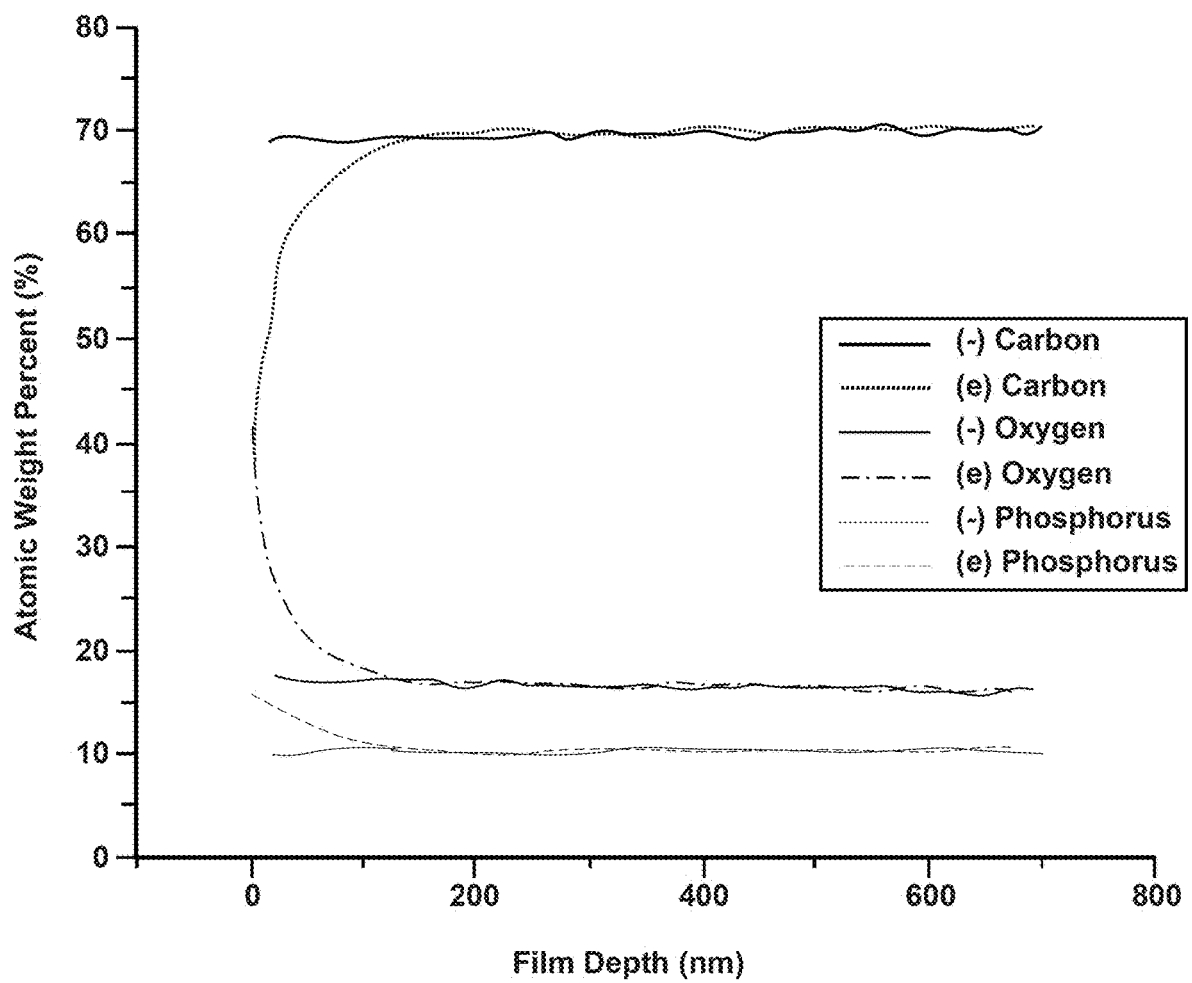
FIG. 12D is a graphical representation of compiled XPS depth profiles of a fourth sample of phenylphosphine oxide epoxy-amines before (–) and after (e) exposure to an AO flux equivalent to $2.88 \cdot 10^{21}$ O·atoms·cm$^{-2}$.

Epoxy-amines with PPO moieties in the backbone were analyzed via XPS depth-profiling after exposure to an AO flux equivalent to $2.88 \cdot 10^{21}$ O·atoms·cm$^{-2}$. FIGS. 12A-12D illustrate graphical representations of compiled XPS depth profiles of PPO epoxy-amines before (–) and after (e) exposure to an AO flux equivalent to $2.88 \cdot 10^{21}$ O·atoms·cm$^{-2}$. FIG. 12A illustrates the compiled XPS depth profile of Sample ID 20-PPO, FIG. 12B illustrates the compiled XPS depth profile of Sample ID 40-PPO, FIG. 12C illustrates the compiled XPS depth profile of Sample ID 66-PPO, and FIG. 12D illustrates the compiled XPS depth profile of Sample ID 100-PPO.

Oxidation of polymer films by AO results in rapid gasification of C-based moieties and leads to significant mass loss. These oxidation reactions also result in changes to the atomic stoichiometry of the remaining material as a function of film depth. The depth behavior of these oxidation reactions is therefore observable by monitoring [C], [O], and [P] as a function of film depth.

As shown in FIGS. 12A-12D, samples that did not experience AO exposure (as indicated by solid lines) maintained consistent [C], [G], and [P] over the depth of the film. In contrast, PPO epoxy-amines that experienced AO flux demonstrate a series of oxidative transitions over the depth of the film; with clear variation in the number of transitions and depth of oxidative degradation corresponding to differences in initial [P].

Prepared epoxy-amines with low [P] (Sample ID 20-PPO) exhibited two oxidative transition events at about 0 nm-about 100 nm and at about 250 nm-about 400 nm (see FIG. 12A). The first event, located at about 0 nm-about 100 nm, is the gradient transition to the ultimate oxidative state of the film prior to surface erosion. The second oxidative transition event occurring at about 250 nm-about 400 nm is the gradient transition to the pristine composition of the film. The analyzed sample further exhibited a 'steady-state' region at about 100 nm-about 300 nm wherein no significant changes in atomic concentration were observed. Because the gradient transition occurring at about 0 nm-about 100 nm appears to be independent of [P], this implies that this gradient transition does not result in further changes to the phosphate portion of the passivation layer.

As [P] increases, such as to the levels of Sample ID 40-PPO (see FIG. 12B), the quantity of gradient transitions decreases to one, which occurs between about 100 and about 250 nm. As shown in FIG. 12C, further increasing the [P] shifts the gradient transition nearer to the surface of the film (e.g., about 30 nm to about 175 nm). A second gradient was observed in Sample ID 66-PPO. The observed second transition occurring between about 0 nm and about 25 nm (see FIG. 12C) includes a loss of [P] and [O] and a rise in [C], the opposite trend expected from formation of a passivation layer. This gradient transition may be indicative of atomization of the passivation layer as a response to high-energy AO reactions.

Figure 13:
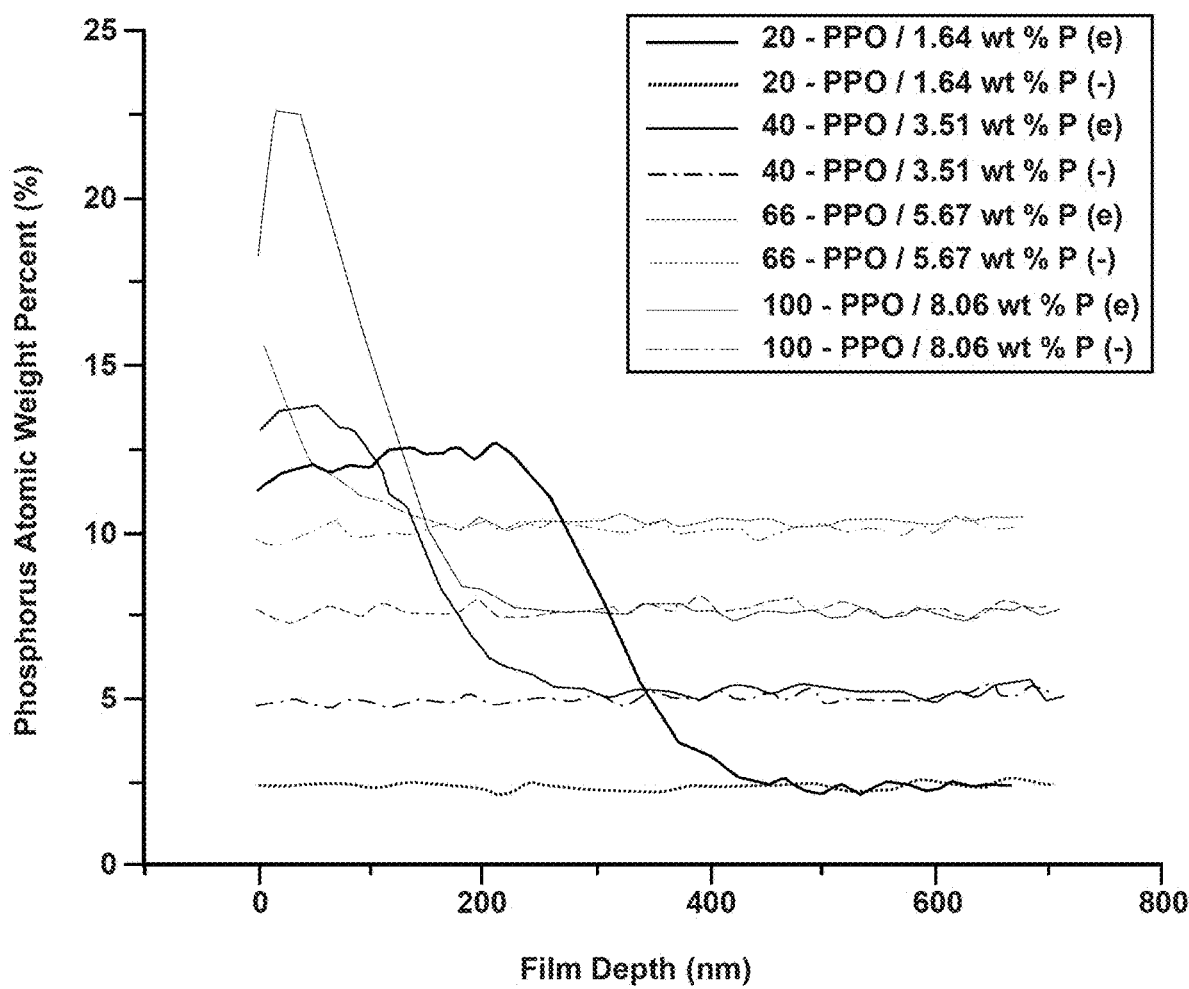
FIG. 13 is a graphical representation of P XPS depth profiles of phenylphosphine oxide epoxy-amines before (–) and after (e) exposure to an AO flux equivalent to $2.88 \cdot 10^{21}$ O·atoms·cm$^{-2}$.

Referring now to FIG. 13, a graphical summary of P XPS depth profiles of PPO epoxy-amines before (-) and after (e) exposure to an AO flux equivalent to $2.88 \cdot 10^{21}$ O·atoms·cm$^{-2}$ is illustrated. Comparing [P] as a function of film depth across all samples reveals that this observation is consistent in Sample IDs 20-PPO, 40-PPO, and 66-PPO, as evidenced by decreases in [P] within 50 nm of the film surface. The PPO epoxy-amine with the highest [P](Sample ID 100-PPO) did not appear to undergo atomization; however the continuous film height loss observed during the AO exposure suggests that atomization continues to occur. It will be understood that it is expected that all polymers with inorganic components included to improve AO resistance will undergo some degree of atomization as the continued erosion of organic polymer components will induce critical structural failures within the passivation layer.

Further differences in passivation layer behavior can be observed in the magnitude of the gradient transition occurring within the deepest portions of the film. In Sample ID 20-PPO this transition is observed to occur at or between about 250 nm and about 400 nm (see FIGS. 12A-12D and FIG. 13). The magnitude of this transition follows a decreasing trend as [P] increases and is likely related to the rate and density of formation of the passivation layer. This suggests that the formed passivation layer is more effective at preventing AO diffusion into the polymer with increasing [P]. Additionally, obtained [P] depth profiles illustrate the thickness of the formed phosphate passivation layer. In samples with low [P] (e.g., Sample ID 20-PPO), the fully formed passivation layer is observed between about 0 nm and about 250 nm. As [P] increases, the fully formed passivation layer is observed to decrease in thickness significantly. At the highest measured [P], no steady state of [P] was observed. This suggests a passivation layer thickness too thin to be detectable through the means used in this work.

Figure 14:
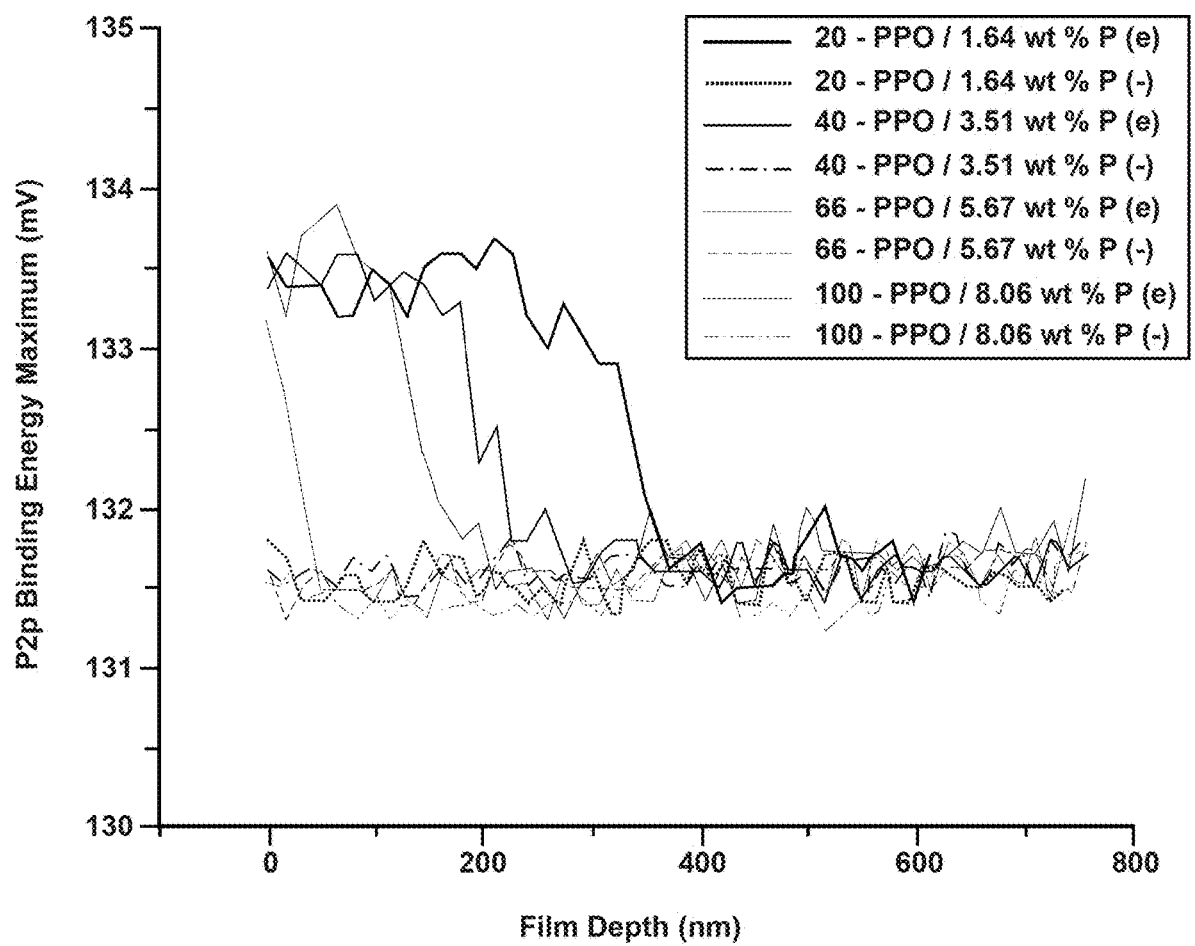
FIG. 14 is a graphical representation of high-resolution P2p spectra of phenylphosphine oxide epoxy-amines as a function of film depth before (–) and after (e) exposure to an AO flux equivalent to $2.88 \cdot 10^{21}$ O·atoms·cm$^{-2}$.

A summary of the high-resolution P2p spectra of PPO epoxy-amines as a function of film depth before (-) and after (e) exposure to an AO flux equivalent to $2.88 \cdot 10^{21}$ O·atoms·cm$^{-2}$ are shown in the graph of FIG. 14, where the P2p peak maxima are reported as a function of film depth. It will be understood that the binding energy of phosphine is approximately 132 eV and further that the binding energy of the phosphate structure present in the passivation layer has been attributed to approximately 134 eV. As shown in FIG. 14, the gradient transition of phosphate formation occurred at the same depth as the [P] gradient transition observed in XPS survey spectra results shown in FIG. 13. This suggests that phosphine oxide oxidation to phosphate occurs in conjunction with the low-energy AO reactions that result in volatilization of C-based moieties. Once the reaction of phosphine oxide to phosphate achieved a steady-state (e.g., about 0 nm to about 100 nm in Sample ID 40-PPO), no further gradient transition was observed until atomization. Sample ID 100-PPO exhibited a rapid transition from phosphate to virgin phosphine. Phosphine oxide is observed to be the majority component within approximately 30 nm of the surface, compared to approximately 200 nm for Sample ID 66-PPO.

TABLE 4

Calculated and obtained O:P ratios for prepared epoxy-amines

| Sample identity | Polymer empirical formula[a] | Calculated O:P atomic ratio | Experimental O:P atomic ratio |
|---|---|---|---|
| 20 - PPO | $C_{112}H_{140}N_9O_{17}P_1S_3$ | 17 | 14 |
| 40 - PPO | $C_{105}H_{124}N_6O_{18}P_2S_2$ | 9 | 8 |
| 66 - PPO | $C_{68}H_{78}N_2O_{12}P_2S_1$ | 6 | 5 |
| 100 - PPO | $C_{46}H_{50}N_2O_6P_2$ | 3 | 3 |

[a]Empirical formulae determined from molar ratios reported in Table 1

Figure 15:
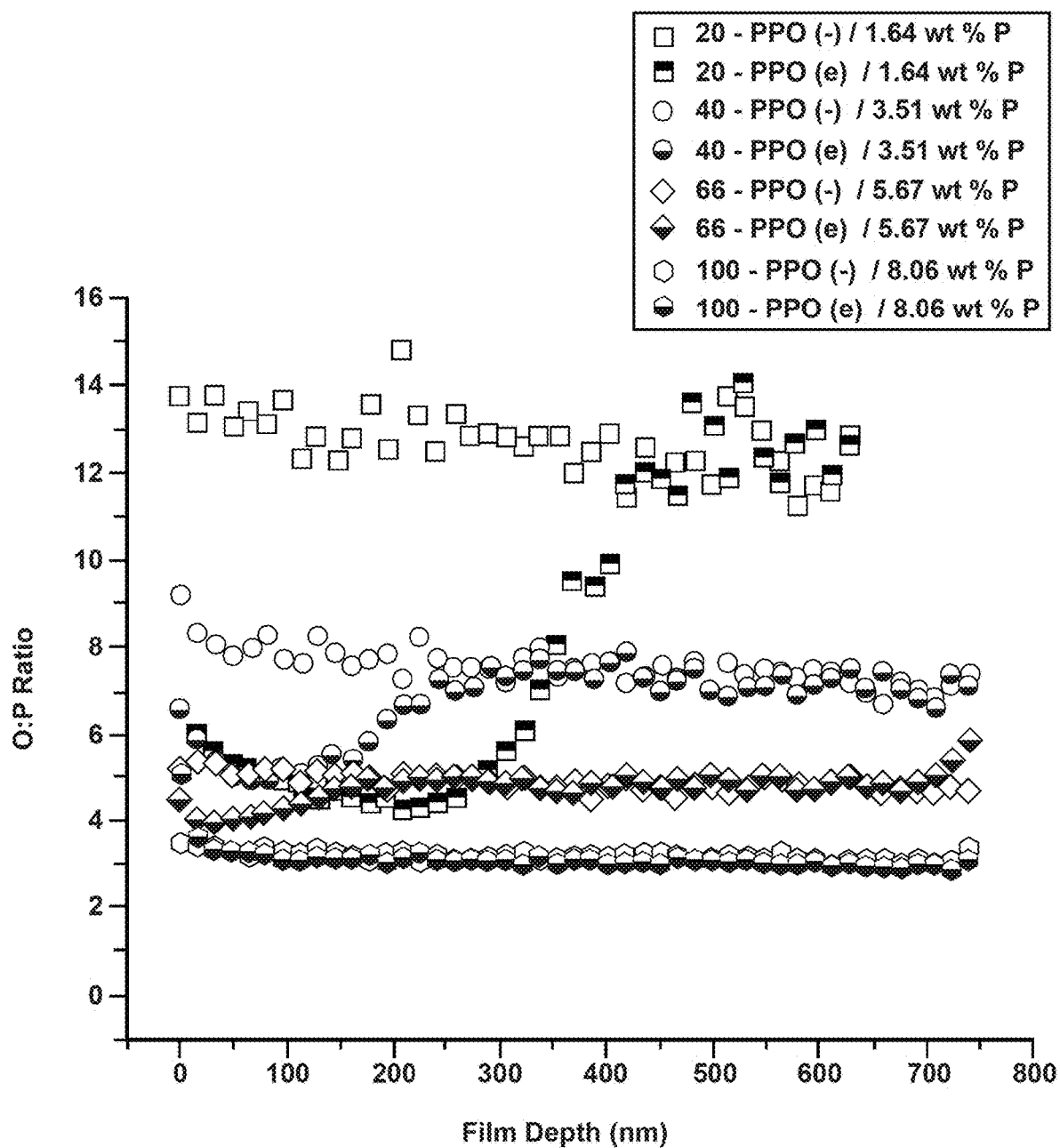
FIG. 15 is a graphical representation of O:P ratios of phenylphosphine oxide epoxy thin films measured by XPS depth profiling before (–) and after (e) exposure to an AO flux equivalent to $2.88 \cdot 10^{21}$ atoms·cm$^{-2}$.

O:P ratios were calculated from polymer empirical formulae for each sample, as set forth above in Table 4. Additionally, the atomic ratio of [O] to [P] was calculated from obtained XPS survey spectra and plotted as a function of film depth. As shown in FIG. 15, O:P ratios of PPO epoxy thin films were measured by XPS depth profiling before (-) and after (e) exposure to an AO flux equivalent to $2.88 \cdot 10^{21}$ atoms·cm$^{-2}$. The experimental O:P ratios of samples unexposed to AO and shown in FIG. 15 were in good agreement with O:P ratios calculated from polymer empirical formulae and remained relatively consistent as a function of film depth. There is a slight decreasing trend in O:P as a function of depth across all samples which may be caused by thermo-oxidative reactions occurring during polymerization. Furthermore, there is an observable amount of deviation in O:P in unexposed samples caused by small differences in atomic concentration resulting in larger deviations in O:P ratio. This deviation does not preclude valuable analyses, as the return to unoxidized O:P after AO exposure remains clear and oxidized regions exhibit consistent O:P ratios.

Within each analyzed sample several noteworthy phenomena were observed: the location of the O:P minimum, the depth of low energy AO reactions occurring deep within the polymer, and the depth of high energy AO reactions occurring near the surface of the polymer.

The O:P minimum is hypothesized to be indicative of a region of the passivation layer wherein AO that permeates to that depth has insufficient energy to react with available moieties. The total thickness of the O:P minimum is therefore anticipated to be indicative of the thickness of the fully formed passivation layer. FIG. 15 depicts the formation of these minima across most samples, excluding Sample ID 100-PPO. The thicknesses of the O:P minima appear to decrease as [P] increases: from about 150 nm in Sample ID 20-PPO to a single point in Sample ID 66-PPO. Furthermore, the appearance of the minima shifted closer to the surface of the polymer with increasing [P], indicative of full passivation layer formation nearer to the surface of the exposed polymer. Generally, this supports a conclusion that increasing [P] decreases the overall passivation layer thickness. However, the PPO epoxy-amine with the highest [P] did not follow the observed trend. It is hypothesized that the fully formed passivation layer is present at the surface of the polymer and occurs in tandem with passivation layer atomization, thereby was not detectable through this analysis.

The depth of low energy AO reactions occurring within the polymer is observable as the transition from a low O:P back to the virgin polymer O:P. At this depth, the energy of AO is reduced and only moieties particularly prone to AO oxidation, such as alkyl moieties, are expected to participate in oxidative reactions. The thickness of this gradient transition is expected to be indicative of the formed passivation layer's efficacy at reducing the energy and diffusion of AO into the polymer matrix. At low [P] the thickness of this layer is observed to be approximately 200 nm, with a trend of decreasing thickness to about 100 nm for Sample ID 66-PPO and about 40 nm for Sample ID 100-PPO. These results suggest that passivation layers formed from polymers with higher initial [P] are more effective at reducing AO diffusion into the polymer matrix and suggest that the formed passivation layers are more effective at reducing the energy of AO that diffuses into the polymer.

The depth of high-energy AO oxidation reactions occurring near the surface of the prepared epoxy-amine polymers can be observed in FIG. 15 as the gradient transition from the minimum O:P (about 4 to about 5) to a final, higher O:P value (about 5 to about 7). In the prepared epoxy-amines with low initial [P], this transition is observed to occur over a depth of about 100 nm for Sample ID 20-PPO. As [P] increases, the transition is observed to shorten from about 100 nm to about 50 nm, about 20 nm, and about 10 nm for Sample IDs 20-PPO, 40-PPO, 66-PPO, and 100-PPO (e.g., samples with 1.64, 3.51, 5.67, and 8.06 wt % P), respectively. The magnitude of the depth of this transition is hypothesized to reflect the depth wherein the formed passivation layer does not prevent the polymer from atomizing. These results demonstrate that atomization cannot be fully prevented at the various [P] studied, and it is expected that atomization will occur so long as the polymer of interest retains organic components. The relatively constant [P] at these depths suggest that the phosphate passivation layer itself remains relatively unchanged as the epoxy-amine matrix around it undergoes significant oxidative degradation.

Figure 10:
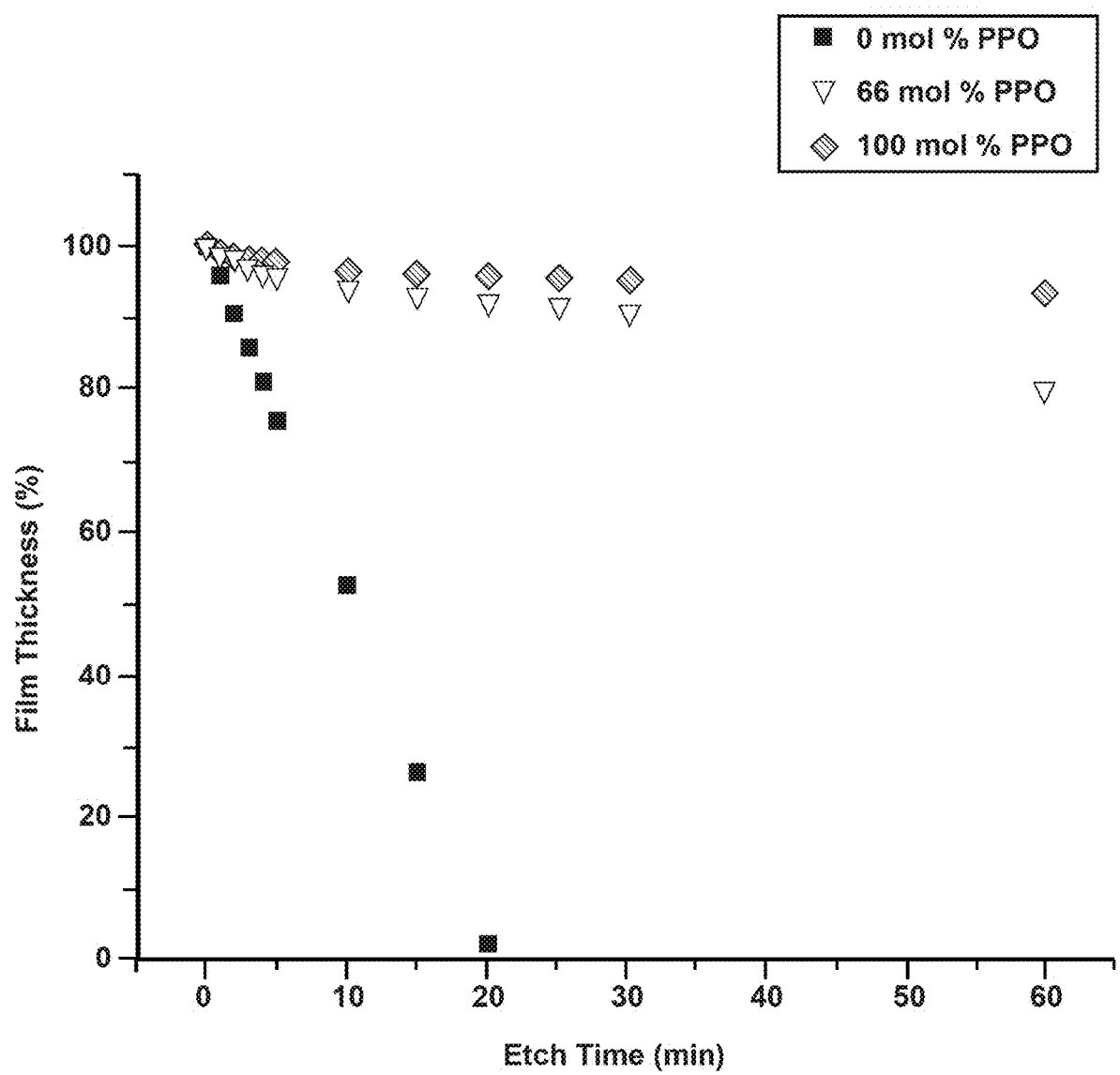
FIG. 10 is a graphical representation of AO degradation resistance of phenylphosphine oxide polymers prepared from a phenylphosphine oxide functional epoxide monomer and curative.

As shown in Examples 1 and 2, the epoxy polymers prepared from the PPO functional epoxide monomers and curatives demonstrate exceptionally high resistance to AO degradation. The PPO functional epoxies demonstrated greater than one hundred times improved lifetimes compared to industry standard epoxies exposed to similar levels of AO (see FIG. 10). This high level of AO stability in the epoxy polymers provides new opportunities for these new materials to serve as matrix polymers and/or protective skins/coatings for polymer matrix composites employed as LEO space materials and other applications. Any application wherein significant oxidative degradation is expected could reasonably be targeted. This could include thermal- and photo-oxidation. An example could be high altitude aircraft, such as DARPA's Vulture aircraft.

All parameters presented herein including, but not limited to, sizes, dimensions, times, temperatures, pressures, amounts, distances, quantities, ratios, weights, volumes, percentages, and/or similar features and data and the like, for example, represent approximate values and can vary with the possible embodiments described and those not necessarily described but encompassed by the epoxy polymers and methods of synthesis. Unless defined otherwise, all technical and scientific terms used herein have the same meaning as commonly understood to one of ordinary skill in the art to which the epoxy polymers and methods of synthesis belongs. Further, references to the singular forms "a" "an", and "the" concerning any particular item, component, material, or product include plural references and are defined as at least one and could be more than one, unless the context clearly dictates otherwise. The terminology employed is for the purpose of describing particular embodiments and is not intended to be limiting in any way.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims or embodiments and any and all equivalents thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A phenylphosphine oxide epoxy-amine composition, comprising:
   a phenylphosphine oxide diamine monomer; and
   a phenylphosphine oxide epoxide monomer crosslinked with the phenylphosphine oxide diamine monomer,
   wherein said composition is an atomic oxygen polymer having a structure:

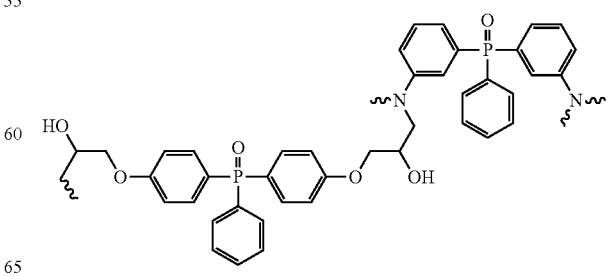

wherein the atomic oxygen polymer hast the structure:

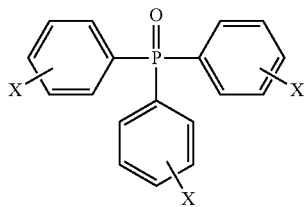

and further wherein the polymer includes aryl groups and phenyl groups, and further wherein each X is one of an epoxide and an epoxide-reactive substituent.

2. The phenylphosphine oxide epoxy-amine composition of claim 1, wherein the aryl groups of the polymer are one of substituted aryl groups and unsubstituted aryl groups.

3. The phenylphosphine oxide epoxy-amine composition of claim 1, wherein the polymer is configured to form a polyphosphate surface layer in response to atomic oxygen (AO) exposure.

4. The phenylphosphine oxide epoxy-amine composition of claim 1, wherein said composition has a phosphorous concentration of at least about 5 percent by weight.

5. The phenylphosphine oxide epoxy-amine composition of claim 1, wherein said composition has a phosphorous concentration of at least about 8 percent by weight.

6. The phenylphosphine oxide epoxy-amine composition of claim 1, wherein said composition has a phosphorous concentration between about 5 percent by weight and about 20 percent by weight.

7. The phenylphosphine oxide epoxy-amine composition of claim 1, wherein said composition has a phosphorous concentration between about 7 percent by weight and about 10 percent by weight.

8. A layered structure comprising:
a substrate; and
a skin cured onto a surface of the substrate, wherein the skin is formed of a phenylphosphine oxide epoxy-amine having a composition of greater than about 8 percent phosphorus by weight, wherein the phenylphosphine oxide epoxy-amine is synthesized from a phenylphosphine oxide epoxide and a phenylphosphine oxide amine and has a structure:

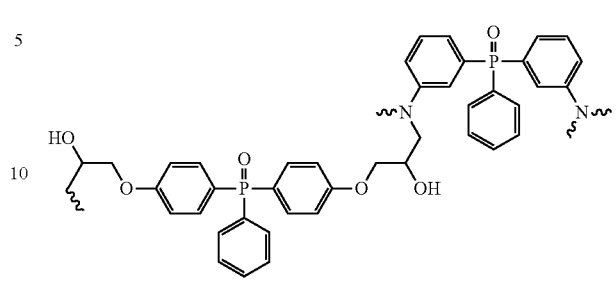

wherein the substrate is a carbon fiber reinforced polymer composite panel configured to be co-cured with the skin.

9. The layered structure of claim 8, wherein the phenylphosphine oxide epoxy-amine is configured to form a polyphosphate surface layer in response to atomic oxygen (AO) exposure.

10. The layered structure of claim 8, wherein the substrate has a composition including functional groups that are reactive with one of an oxide and an amine.

11. The layered structure of claim 8, wherein the phenylphosphine oxide epoxy-amine is an atomic oxygen polymer further having a structure:

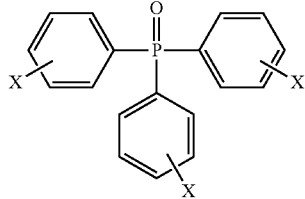

wherein the polymer includes aryl groups and phenyl groups, and further wherein each X is one of an epoxide and an epoxide-reactive substituent.

* * * * *